United States Patent
Thieberger (12)

(10) Patent No.: US 6,786,595 B1
(45) Date of Patent: Sep. 7, 2004

(54) FLAT OPHTHALMIC LENS SYNTHESIZED FROM ITS SPECIFICATIONS

(76) Inventor: Gil Thieberger, 22 Hana Senesh Street, Kiryat Tivon (IL), 36036

( * ) Notice: Subject to any disclaimer, the term of this patent is extended or adjusted under 35 U.S.C. 154(b) by 0 days.

(21) Appl. No.: 09/535,547

(22) Filed: Mar. 27, 2000

(51) Int. Cl.$^7$ .................................................. G02C 7/02
(52) U.S. Cl. ...................................... 351/159; 351/177
(58) Field of Search ................................. 359/742, 743; 351/159

(56) References Cited

U.S. PATENT DOCUMENTS

| | | | |
|---|---|---|---|
| 3,904,281 A | | 9/1975 | Jampolsky |
| 4,070,105 A | * | 1/1978 | Marzouk .................... 351/159 |
| 4,146,306 A | * | 3/1979 | Wallach ....................... 359/743 |

* cited by examiner

Primary Examiner—Scott J. Sugarman

(57) ABSTRACT

This invention pertains to thin arched prescription lens (58), mainly suited for ophthalmic applications, which are designed to be manufactured as a thin flat sheet, and after or while being manufactured, the thin sheet is folded to the predefined arched shape.

36 Claims, 15 Drawing Sheets

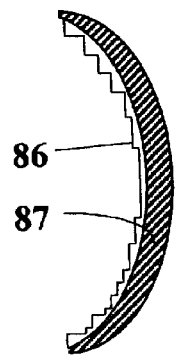 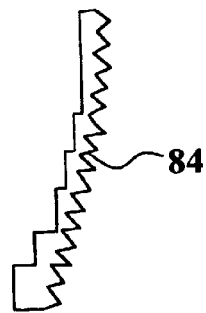
FIG. 25    FIG. 26
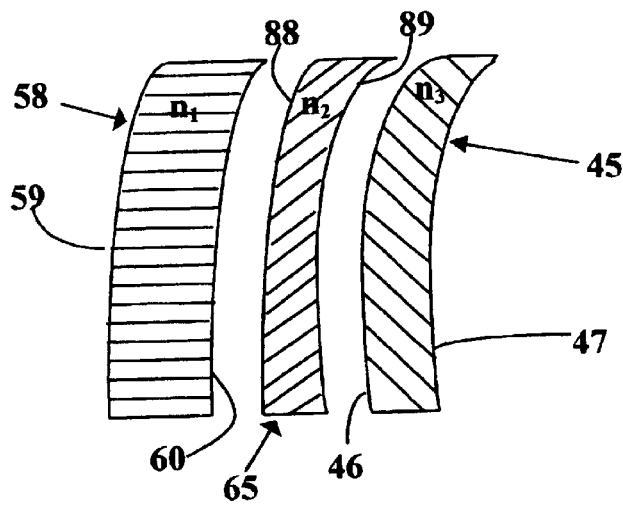
FIG. 27
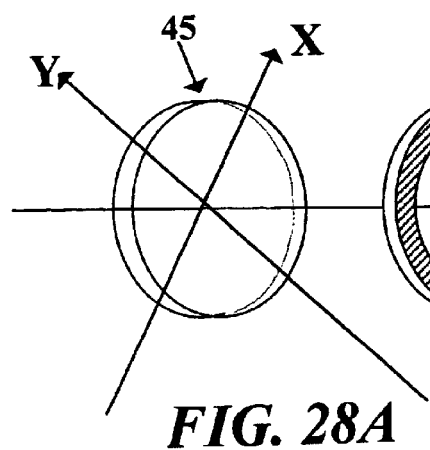 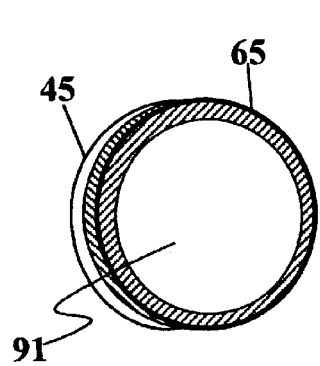
FIG. 28A    FIG. 28B

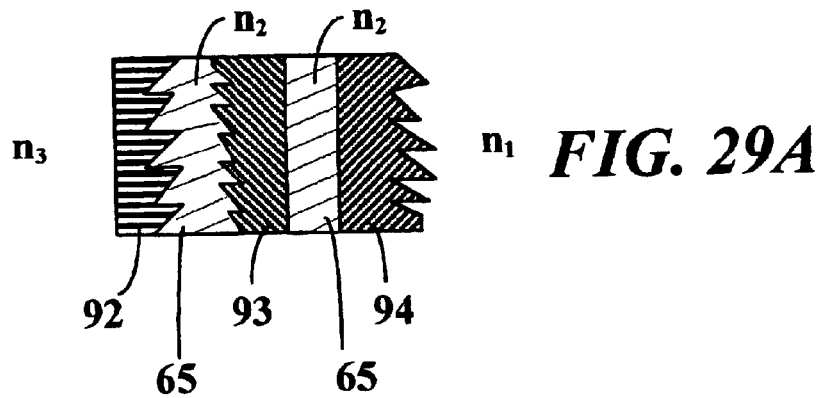
FIG. 29A
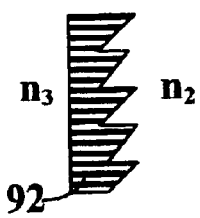 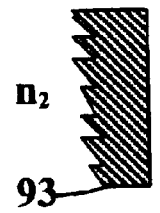 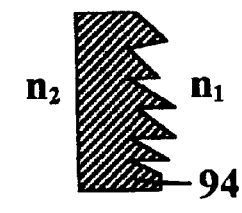
FIG. 29B   FIG. 29C   FIG. 29D
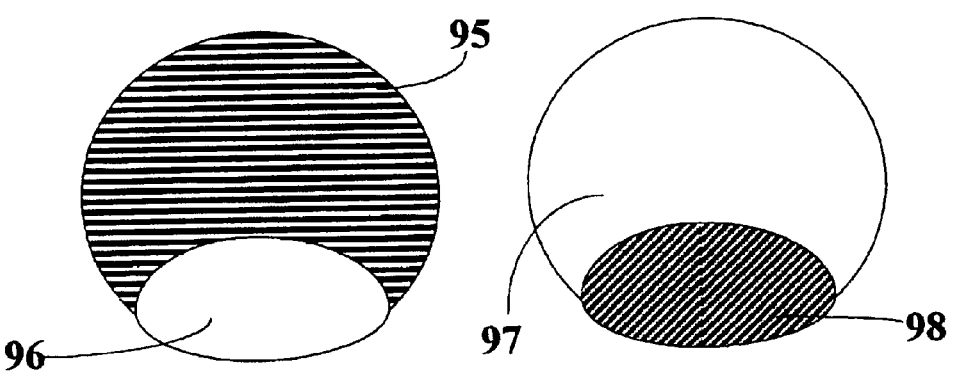
FIG. 30A   FIG. 30B

FLAT OPHTHALMIC LENS SYNTHESIZED FROM ITS SPECIFICATIONS

BACKGROUND OF THE INVENTION

1. Field of the Invention

This invention relates to a thin novel prescription lens, which is manufactured flat but is being used arched, curved, concaved, or convexed, and a method which the design is synthesized from its specification.

2. Terms Definition

The term "eyewear" as used herein is defined as any light-transmitting element or elements in front of the eyes.

The term "prescription" as used herein is defined as a specific combination of optical parameters that meets the needs of a particular person in purpose to solve a large variety of treatments and diagnostic problems known to eye specialists, or the required optical function/properties whenever the article is not an ophthalmic lens.

The term "Thieberger-design-lens" as used herein is defined as the novel lens of my Co-Pending PCT Patent "Application "Ophthalmic lens synthesized from its specifications", date Aug. 31, 1998 Number PCT/IL98/00420, incorporated herein by reference.

The term "flat-Thieberger-design-lens" as used herein is defined as the novel thin lens of this invention.

The term "arched" as used herein is defined as any curved shape which can be made by folding or curving a flat sheet, or by folding or curving a sheet which has at-least one flat surface. For example: half a cylinder (cut through its main axis) will be called herein "an arched shape" because it can be made from a flat sheet. For purposes herein, folding, curving, and arching are meant the same.

The term "flat" as used heroin is not limited to the geometric definition of flat surface (i.e. all the points on the flat sure are on the same geometric plane) but it indicates any abase" three dimensions structure that by folding or curving it we get a required predetermined shape (which will be called herein "arched" shape although it is not made by folding or curving a "geometric" flat sheet).

The term "saw-toothed surface" as used herein is defined as a surface having a plurality of discontinuities. That surface may be characterized by having a saw-toothed surface, and/or having a steps function nature, and/or having a plurality of grooves or protrusions or saw-teeth, and/or may be defined as a surface that contains a plurality of points or lines or zones wherein the surface is not being at least twice continuously differentiable. Herein all these terms are equivalent.

3. Description of Prior Art

In 1748, Count Buffon proposed to grind out of a solid piece of glass a lens in steps or concentric zones, in order to reduce the thickness of the lens to a minimum. In 1822, Augustin Fresnel, for whom the Fresnel lens is named, conducted a lens in which the centers of curvature of the different rings receded from the axis according to their distances from the center.

Modern flat Fresnel lenses consist of a series of concentric prismatic grooves, designed to cooperatively direct incident light rays to a common focus or focuses. This type of lens is thin, lightweight, can be made elastic, shook resistance, and almost unbreakable. Modern flat Fresnel lenses can be inexpensively and accurately mass-produced using known replication techniques. The problem with Modern flat Fresnel lenses is that they are designed to be flat. As a result, when a designer design an eyewear which contains Fresnel lens, one of his considerations must be the lens' flat shape.

U.S. Pat Nos. 3,698,854 and 3,904,281, each issued to Jampolsky, discloses a thin, fully conformable, planarly smooth, plastic membrane which applied and made to adhere with finger pressure to a conventional spectacle lens. The step quickly changes one or more optical characteristics of the spectacle lens or provides a change in the light transmission across the field of view. Those two patents force a thin flat Fresnel lens, which was designed to be used as a flat lens, to adhere to any light-transmitting element Jampolsky did not disclose a flat Frenel-type lens which is designed especially to be used arched or concaved or convexed. Consequently, when that lens was adhered to the spectacles, there were optical imperfections, distortions, and aberrations visible to the wearer.

In my co-pending PCT Patent Application "Ophthalmic lens synthesized from its specifications", from date Aug. 31, 1998 Number PCT/IL98/00420, I disclosed a lens having very good optical quality that can be made to almost any shape and almost any thickness the designer whishes. That lens can convert any unprescription eyewear to prescription eyewear, and/or manufacture prescription eyewear which has any desired shape, and/or manufacture prescription lenses which are enough thin and flexible to enable people to cut and shape their lenses. In addition, that lens can be laminated.

It was found out that it is less expensive to manufacture a flat saw-toothed lens than to manufacture a not flat saw-toothed lens.

There was a need to develop an ophthalmic lens which is on the one hand as inexpensive as a flat Fresnel lens when mass-manufactured, and on the other hand will not suffer from optical imperfections, distortions and aberrations visible to the wearer when it will be arched. With that inexpensive lens we can convert a large amount of unprescription eyewears to prescription eyewears, or make an inexpensive lens that can be very thin, lightweight, flexible, and unbreakable, in a large variety of arched shapes.

The previous art prescription lenses are rigid and thick. Shaping and cutting those lenses require expensive tools which are not accessible to most of the people. As a result, most of the people don't have unique eyewears. People cannot cut their lenses to the shape they want, fashioners cannot cut the lenses to shapes that will fit to the dress, the haircut, the car . . . they designed, etceteras, herein after refer to "recreational stuff".

Similarly to lenses, It was found out that it is less expensive to manufacture a flat saw-toothed mirror than to manufacture a not flat saw-toothed mirror. There was a need to develop a mirror which is on the one hand as inexpensive as a flat Fresnel mirror when mass-manufactured, and on the other hand will have an arched shape and will not suffer from optical imperfections and distortions and aberrations visible to the observer.

OBJECTS AND SUMMARY OF THE INVENTION

It is a primary object of the present invention to provide an arched optical surface and more specifically an arched prescription optical surface, such as an arched optical device and arched ophthalmic lens. Novel arched mirrors are also considered a part of this invention. These products are commonly referred to as Flat-Thieberger-design-lenses, including mirrors, that can have almost any desired arched shape.

It is another object of the present invention to provide a less expensive arched Thieberger-design-lens. Most of the design process of Flat-Thieberger-design-lens is similar to the design process of Thieberger-design-lens, but it is manufactured as a flat lens and after or while manufacturing it is folded to the predetermined arched shape. Because flat-Thieberger-design-lens is manufactured as a flat lens, it is usually less expensive than Thieberger-design-lens.

The surface can have any thickness as long it can be arched. There is almost no connection between the thickness and the arched macroscopic shape of flat-Thieberger-design-lens to its optical characteristics It is another object of the present invention to provide a method which the design is synthesized from its specification. The design method permits generation of different families of arched lenses, embodying different selections of other parameters such as zones size and placement, eye path, etc.

Flat-Thieberger-design-lens has three main preferred embodiments. An Add-on type Flat-Thieberger-design-lens, a Stand-alone type Flat-Thieberger-design-lens, and a composition of the former.

Add-on type Flat-Thieberger-design-lens is bonded or attached to an eyewear that contains an arched lens. Its main purpose is to convert an unprescription arched eyewear to a prescription eyewear or to change one or more optical characteristics of any arched prescription or unprescription optical element, what ever its kind or use.

Add-on Flat-Thieberger-design-lens by itself may also be too thin to provide a desirable degree of impact strength, thus cannot be used individually.

The Add-on Flat-Thieberger-design-lens may cover all the surface of the lens of the eyewear or only a part of it. It may be attached or adhered permanently or impermanently to the front and/or rear surface of the eyewear. It may be used for cost reduction.

The main purpose of the Stand-alone Flat-Thieberger-design-lens is to provide a better alternative to conventional prescription lenses.

It is another object of the present invention to provide an arched prescription lens which may be very light-weight, may be elastic (suitable for instance to sport activities, safety glasses, children's glasses, etc.), may be almost unbreakable, inexpensively mass-produced, may have large angular viewing range, may have high power and very low aberrations, may be enough thin and soft to enable people to cut and shape their lenses as they wish by using simple cutting accessories such as scissors and the like.

It is another object of the present invention to provide a laminated Flat-Thieberger-design-lens made of two or more layers. Light reflective or polarizing material may be provided between the layers. One of the layers can be provided with photochromic characteristics. That laminated lens has all the economic advantages of the previous art laminated lenses, has all the economic advantages of laminated Thieberger-design-lens, and in addition, has all the economic advantages of Flat-Thieberger-design-lens.

Organic (polymers and plastics) lenses are less fragile, lighter, and more economically mass-manufactured then glass lenses, but are inferior to glass lenses with respect to hardness, scratch resistance, resistance to radiation, ability to receive a wide range of lasting surface treatments (such as anti-reflecting, reflecting, coloration), and photochromic durability.

It is another object of the present invention to provide a high quality laminated arched composite lens, composed of one or more organic Flat-Thieberger-design-layers and an arched glass layer. That composite lens incorporates all the advantages of organic lenses and all the advantages of glass lenses. In addition, it can have highly impact resistance and highly shatter resistance. The organic layer may also be used for correcting aberrations of the glass layer, such as, for example, chromatic aberration.

Flat-Thieberger-design-lens may be combined with conventional stock lenses.

It is another object of the present invention to provide a thin, lightweight, and high quality prescription lenses for patients who have suffered cataract, or some retinal or optic nerve damage which results in decreased visual function due to decreased visual acuity, or decreased visual field, or formation of blind spots, or a combination of thereof. This object can be achieved since the arched prescription lens of the present invention has rough surface, which permit individual calculation of each normal to the prescription lens in such a way that optimal correction can be obtained for each eye viewing angle in the viewing zone, and/or optimal minimization of the residual and peripheral astigmatism and blur can be obtained for each viewing-axis depending on the selected eye model and according to the lens characteristics and profile of use Flat-Thieberger-design-lens may be partially or entirely tinted to pass or reflect certain wavelengths of light, may be diffused, or blurred uniformly or differentially, may have selective opaque or transmitting areas or a combination thereof, may be coated with polarizing material, may be coated with scratch resistant material, may be coated with anti-static material, may be coated with holographic recording material as disclosed for example in U.S. Pat No. 5,432,623, may be marked as disclosed for example in U.S. Pat. No. 4,619,504.

The prescription parameters (such as eye path location, axis, power, cylinder location, etc.) may be noted on the lens with impermanently ink or on a non-stick protective covering, etc.

In a preferred embodiment, Flat-Thieberger-design-lens is covered with a protective layer which protects its saw-toothed surface against scratches, dust, etc.

It is a further object of the present invention to provide a method that controls on the arched lens' viewed geometric pattern (caused be the discontinuities of the surface) in purpose to make a more aesthetic and fashioned article, and to enable the designer to optimize to minimum the diffraction aberrations and the image blur and to optimize the manufacturing process.

In order to carry out all the objects of the present invention, the lens' designer defines the desired arched macroscopic surfaces of the Flat-Thieberger-design-lens (the shape of the lens after folding or curving it to the desired shape). One surface (or both of them) is not smooth but has a microscopic surface that looks like a saw-toothed surface, sometimes refer to as a saw-toothed zone or as a saw-toothed surface zone or as a prescription saw-toothed surface zone (each saw-tooth is smooth of course). The design process assumes that the locations of the object, the lens, and the required image are known. By using Ray-tracing technique we calculate the microscopic normals to the lens' surface that will form the required image. The final microscopic surface (which looks like a saw-toothed surface) is obtained by a continuously summation of the slopes (which are obtained from the previous calculated microscopic normals to the lens' surface). Before starting to sum the slopes, we set a set of conditions, which will be called herein "Geometric pattern conditions" or predetermine condition/s. Those conditions may be any one or all of the following: condition on H, geometric condition, diffraction consideration, quality of the formed image, cosmetic factors, grinding technique, manufacturing technique, surface durability, tolerance budgeting methods. Those conditions determine the dimensions of each saw-tooth, i.e., until when the slope summation process will continue and when there will be a discontinuity and a new slope summation for a new saw-tooth will begin. The Geometric Pattern Conditions can determine directly the size or height of the saw-tooth by using a condition on the shape or on the height, or determine indirectly by using a condition on the diffraction effect or the image quality, i.e. the slope summation process will continue until the diffraction effect will get to some predetermined value or the image blur be less than a predetermined value. After setting the "Geometric pattern conditions" we transform the lens' three dimensions arched shape (including the calculated microscopic normals and the Geometric pattern conditions) to a plane (the lens is flattened). When that flat lens will be folded to the desired arched shape, we will obtain exactly the previous arched shape, with the same microscopic normals to the surface. The final microscopic surface will be obtained by a continuously summation of the transformed slopes in-conjunction with the transformed Geometric pattern conditions.

It is another object of the present invention to provide unifocal and multifocal arched mirrors. Those mirrors can be made flexible.

The novel arched prescription lens of the present invention enable the manufacturer to produce an arched saw-toothed prescription lens that cost the same as a flat saw-toothed prescription lens.

Further objects, features and advantages of the present invention can be more completely understood by reference to the detailed description of preferred embodiments, taken in conjunction with the drawings, and from the appended claims.

BRIEF DESCRIPTION OF THE DRAWINGS

FIG. 25 is a cross sectional view of a combined Flat Thieberger design lens-mirror system.

FIGS. 26 is a cross sectional view of an elastic Flat-Thieberger-design-mirror.

FIG. 27 is a cross sectional exploded view shows an adhesive adapter.

FIGS. 28A, B show another possible adhesive configuration.

FIG. 29A is a cross sectional view shows a three layers laminated Stand-alone Flat-Thieberger-design-lens.

FIGS. 29B–D are cross sectional views that show each layer in its appropriate media for the microscopic surface design.

FIGS. 30A, B are front plan views that show a distance vision layer and a close-up vision layer, which are designed to avoid overlapping saw-toothed zones.

DETAILED DESCRIPTION OF PREFERRED EMBODIMENTS

Figure 1:
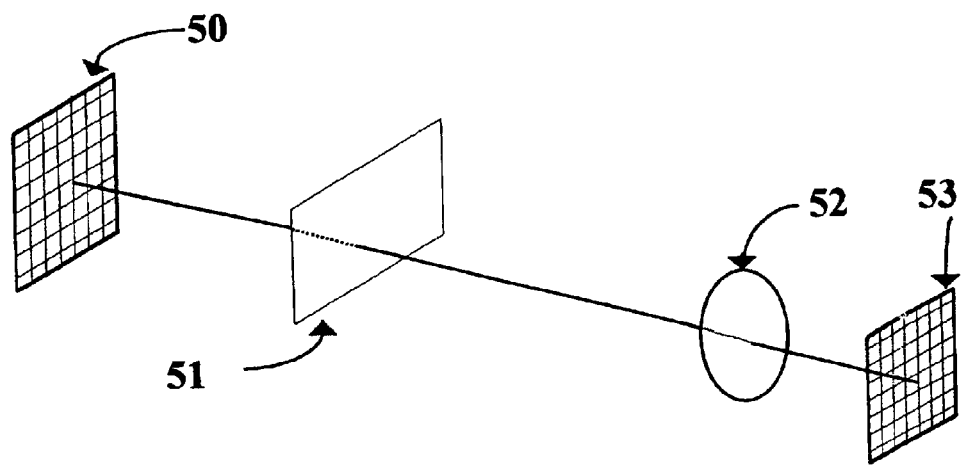
FIG. 1 is a schematic representation of the setup assumed in the design process of the present invention.

Contents
1. The design process of Stand-alone Flat-Thieberger-design-lens
2. The design process of add-on Flat-Thieberger-design-leas
3. The geometric pattern conditions
4. Protected Flat-Thieberger-design-lens
5. Flat-Thieberger-design-mirror
6. Methods for cost reduction
7. Laminated Flat-Thieberger-design-lens
8. Additional preferred embodiments 9. Manufacturing and materials 1. The Design Process of Stand-alone Flat-Thieberger-design-lens Step #1: The design process assumes that the object and its corresponding image (which is a function of the prescription lens characteristics) are known, thus, before start synthesize Flat-Thieberger-design-lens we have to calculate, by ordinary Ray-tracing, the image derived from the object accordingly to the required prescription lens characteristics (such as power, cylinder, prismatic, etc.). This calculation is repeated (only once) for each prescription that we intend to use.

FIG. 1 is a schematic representation of the setup assumed in the design process, which consist of :Object plane 50, lens plane 51, Ideal camera lens 52 at the aperture stop of the system and an Image plane 53. The three dimensional locations of the system's parts depend on lens power and eye path location.

Figure 2:
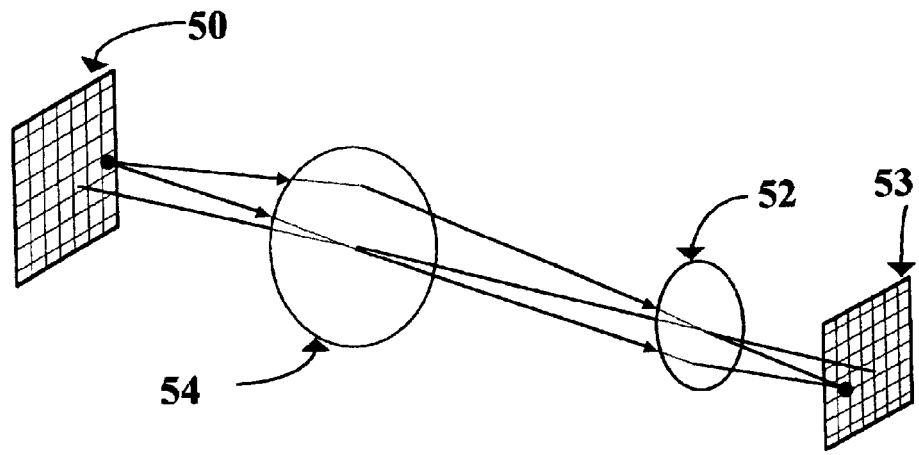
FIG. 2 is a schematic representation of the image calculation.

FIG. 2 is a schematic representation of the image calculation. The prescription lens 54 is placed in the lens plane 51. The object 50 and the camera lens 52 are placed accordingly to the lens' power. Two rays from an object point, one through the center of the prescription lens 54 and one through the center of the camera lens 52, define the corresponding image point.

Figure 3:
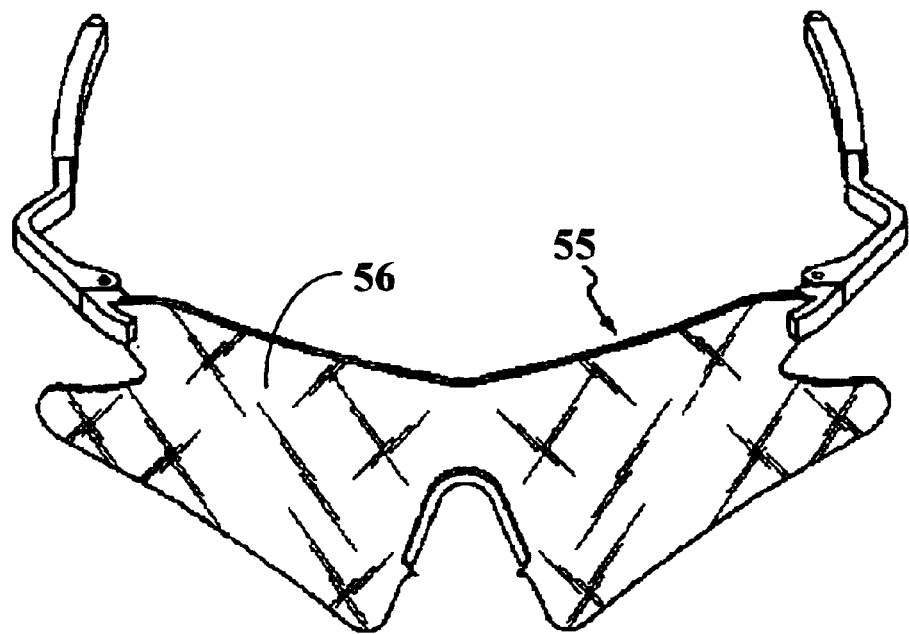
FIGS. 3 and 4 are front plan views of an arched eyewear which was designed without prescription considerations.
Figure 4:
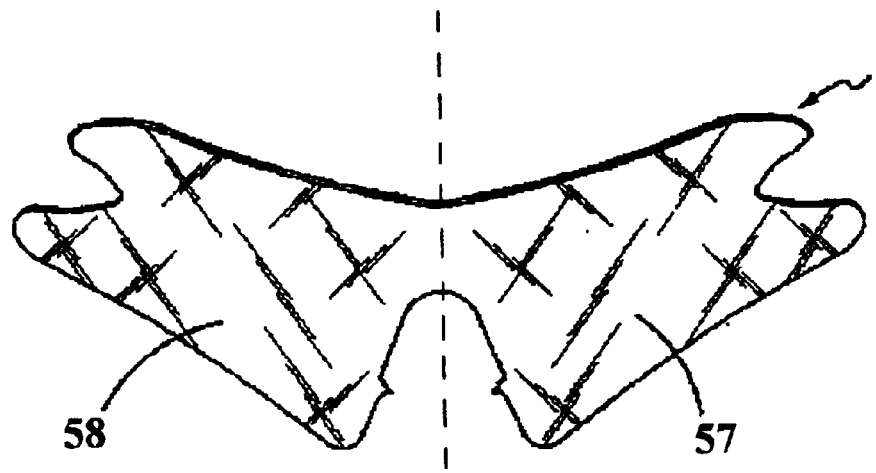

Step #2: The designer designs a thin arched eyewear. He may do it without prescription considerations. FIG. 3 is an example for an arched eyewear 55 which was designed without prescription considerations. The eyewear contains one portion lens 56 so we will split it to right region 57 and left region 58 which can be seen in FIG. 4. From here, we will refer only to one region (58), the other (57) is synthesized similarly.

Figure 5:
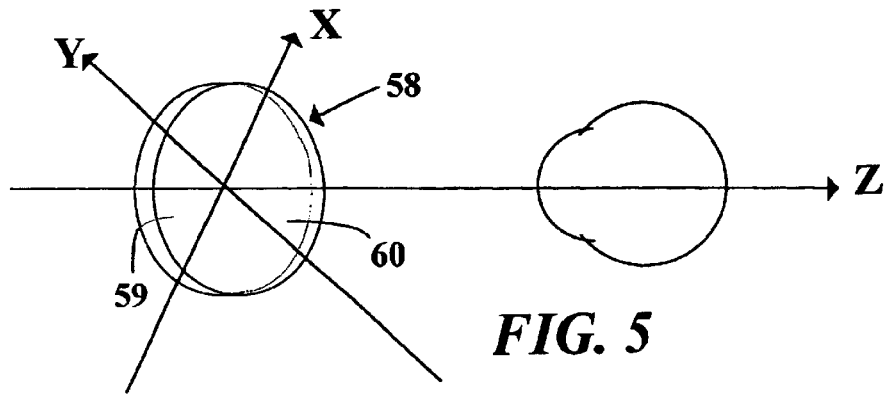
FIG. 5 shows the axis system used in the design process.

Step #3: Find the global coordinates matrixes that specify the surfaces 59 and 60 that make up the eyewear's lens 58, when the Z axis coincides with the main eye-path (the eye-path through the main vision portion) as shown in FIG. 5. Those matrixes can be obtained by any known method. For instance, if the lens has a known shape, its surface coordinates can be calculated numerically. If there is a prototype, it can be scanned by a XYZ machine, etc.

Step #4: What kind of prescription is desired ?. For instance, unifocal, multifocal, progressive, etceteras. Where to place each viewing zone ?. For instance, far viewing zone at the upper portion of the lens and close-up viewing zone at the bottom portion of the lens. Divide the eyewear lens to equal-power zones. Progressive varying power zones will be divided to discrete equal-power zones.

Step #5: LENS SETUP procedure. Referring to FIG. 1, Place the eyewears lens 58 at the lens plane 51. Choose an equal-power zone. According to the required eye path and the required power of that equal-power zone, place the object 50, place the camera lens 52, and place the image 53.

Step #6: CALCULATION OF THE NORMAL TO SURFACE. The locations of the object points, the locations of corresponding image points, and the location of the camera lens are known. The macroscopic shape of the eyewear lens is known (58). By using Ray-tracing technique we find the required microscopic normals to one of the surfaces, while the other is smooth as demonstrated in FIG. 6, or find condition on the microscopic normals to the surfaces in case where both surfaces have microscopic saw-toothed surface as demonstrated in FIG. 7. FIG. 8 shows schematically a simplification that can be made. Of the many rays that can be treed for each point of the object, one ray uniquely defines the required microscopic normal to the surface. It is the ray that passes through the center of the aperture stop places in the plane of the camera lens $(x_C, y_C, z_C)$, known as the chief ray. 61 and 62 are the tangents to the surfaces in the intersection points. Snell's law states: $n'(S \times r')=n(S \times r)$ where $r=(\alpha, \beta, \gamma)$ is the ray unit vector. $S=(L,M,N)$ is the normal to the surface. n is the refraction index.

Figure 8:
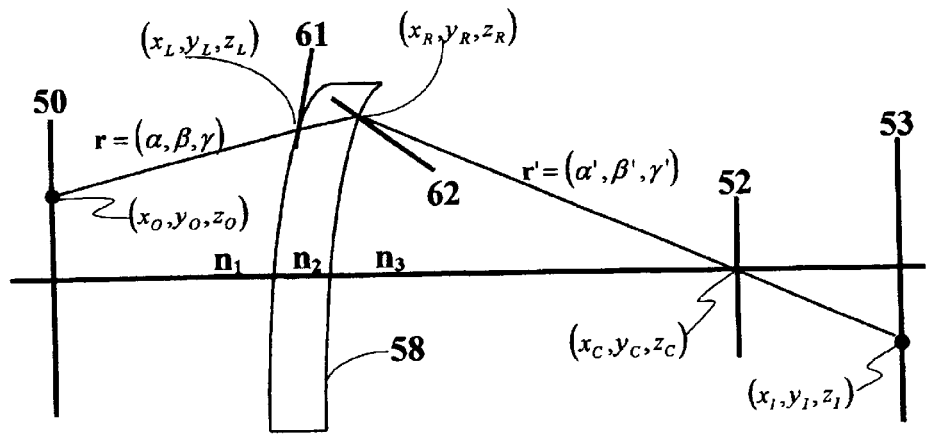
FIG. 8 is a schematically representation of tracing the chief-ray.
Figure 9:
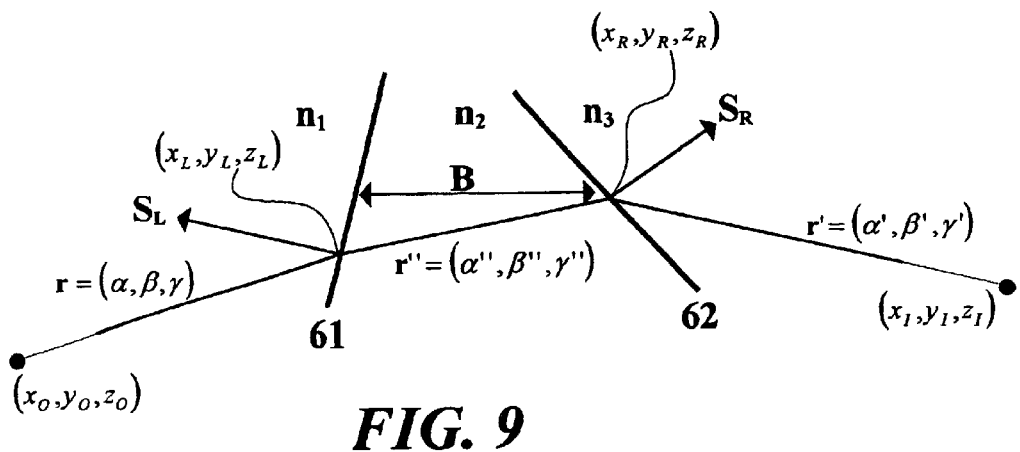
FIG. 9 is an enlarge view of FIG. 8.

Referring to FIG. 8, $r'=(\alpha', \beta', \gamma')$ derived from points $(x_1, y_1, z_1)$ and $(x_C, y_C, z_C)$. Point $(x_R, y_R, z_R)$ is the intersection point between the vector defined by points $(x_1, y_1, z_1)$ and $(x_C, y_C, z_C)$ to the rear surface of the eyewear lens which is specified by the surface's coordinate matrix. Referring to FIG. 9, in the case where the front surface is smooth, $r=(\alpha, \beta, \gamma)$ can be obtained with few iterations consist of: guess $(x_L, y_L, z_L)$, calculate $r=(\alpha, \beta, \gamma)$, calculate $r''n_1(S_L \times r)=n_2(S_L \times r'')$, is the intersection point of r'' with the rear surface is $(x_R, y_R, z_R)$ ?. The normal to the rear surface $S_R$ is obtained by solving Snell's law for $S_R$ $n_3(S_R \times r')=n_2(S_R \times r'')$. The case where the rear surface is smooth and the front surface has microscopic saw-toothed surface is solved similarly. In the case where both surfaces have microscopic saw-toothed surfaces, we have a degree of freedom when choosing $S_R$ and $S_L$.

Step #7: The computation so far has given us the necessary normal to surface at the intersection point, or conditions for the normals in the case where both of the surfaces have microscopic saw-toothed surface. Repeat step 6 for all chief-rays from image that intersects the eyewear surface in the current equal-power zone.

Step #8: Repeat steps 5–7 for all equal-power zones. We ended up with a matrix of normals to surface, or two matrixes of conditions on the normals in the case where both of the surfaces have microscopic saw-toothed surface. Those surface normals (which define the curvature and the curvature directions, or the principal curvature and principal curvature directions when the disorder is not corrected particularly to each viewing angle but to each main viewing axis according to the eye model) will be converted into surface heights at step 10.

It is important to trace sufficient number of rays through the eyewear's lens. Usually, few hundreds to few thousands rays to square centimeter are adequate. The number mostly depended on the eyewear's surface complexity and the desired prescription lens. Interpolation may be used to increase density where needed.

Figure 10:
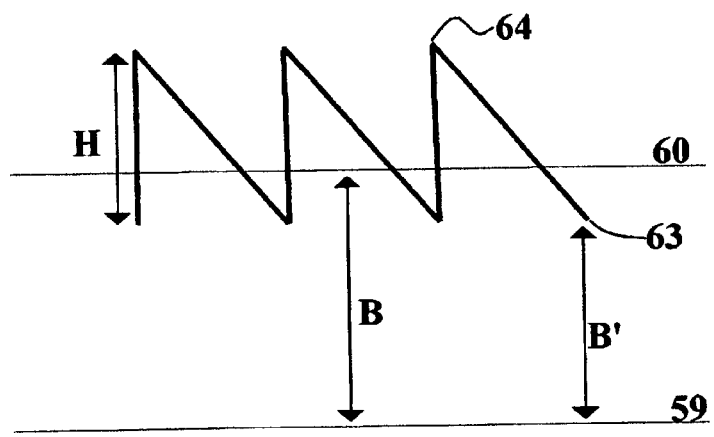
FIG. 10 is a cross sectional view that shows the lens thickness and the saw-tooth height.

Referring to FIG. 10, surfaces 59 and 60 are defined by the designer (taking in account the arch limitation) and specified in the surface coordinates matrixes. B is the initial thickness of the lens at point (x,y) and is calculated by $Z_{60}(x,y)-Z_{59}(x,y)$ where $Z_{60}(x,y)$ is the Z coordinate of point (x,y) in surface 60 and $Z_{59}(x,y)$ is the Z coordinate of point (x,y) in surface 59. 63 is the base point of the saw-tooth. 64 is the highest point of the saw-tooth. H is the maximum height of the saw tooth and is calculated by $Z_{64}-Z_{63}$. B' (which will be called herein "the base") is calculated by $Z_{63}(x,y)-Z_{59}(x,y)$. As B' increase, the lens' thickness and impact resistance increases.

Step #9: Transform the microscopic normals to the arched surface, to microscopic normals to a flat surface.

Each point on the arched surface has its corresponding point on the flat surface (deriving from the definition of the arched surface) and by using these connections (between the arched surface to the flat surface) we can find the transformations for calculating the direction of the microscopic normals to the flat surface that correspond to the calculated microscopic normals to the arched surface.

The transformation of the calculated microscopic normals (to the arched surface) to microscopic normals to a flat surface can be done by using a lot of well known in the art mathematical methods for vector transformations or axis transformations, such as, for example, Direction Cosine Matrix, Transformation Matrix, Euler Angle Transformations, etc.

We ended up with a matrix of normals to a flat surface, or two matrixes of conditions on the normals in the case where both of the flat surfaces have microscopic saw-toothed surfaces.

Step #10: Obtaining the surface from the calculated normals, with geometric pattern condition considerations.

The foregoing computation produced a matrix of normals to a plane surface. An area on the plane is assigned to each normal. The surface is obtained from those normals by a process of summation the slopes with boundary continuity considerations and geometric pattern condition considerations. Each normal S(L,M,N) defines a plane L(X−x)+M(Y−y)+N(Z−z). The boundary of the plane is defined by the midpoints between neighboring planes as shown in FIG. 11 or is the average of two midpoints when there are two neighboring matrix points as shown in FIG. 12.

The surface heights are obtained from the surface slopes by a process of summation. The summation begins from the base point 63 of the saw-tooth, which is defined by the designer, and continues until a geometric pattern condition is fulfilled.

Figure 11:
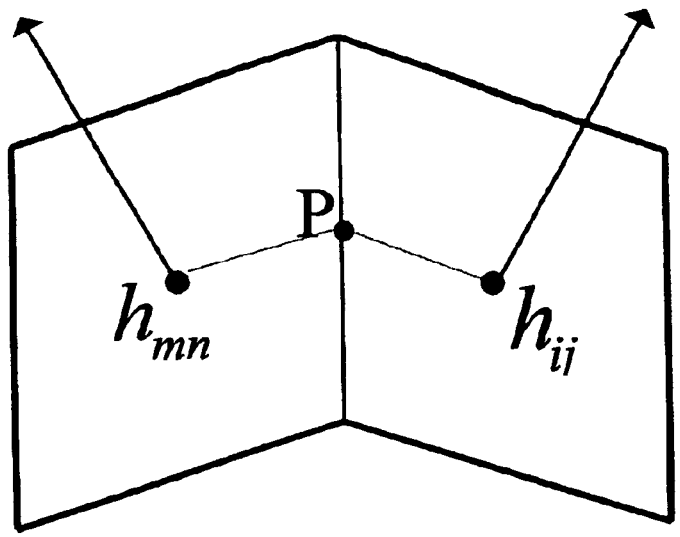
FIG. 11 shows the boundary continuity consideration definition with one neighboring plane.
Figure 12:
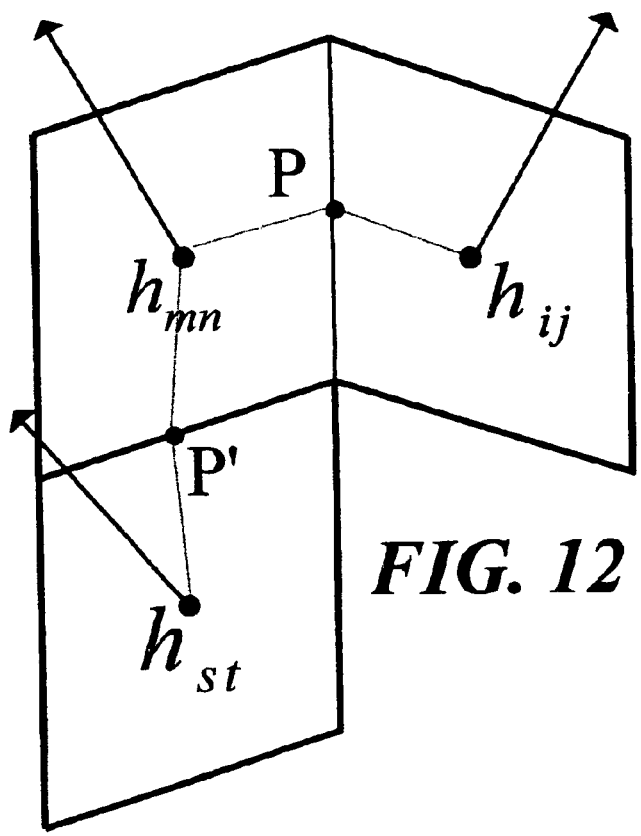
FIG. 12 shows the boundary continuity consideration definition with two neighboring planes.

Referring to FIG. 11, consider two neighboring planes at matrix points (i,j) and (n,m). The height at point (i,j) is known from a previous calculation and therefore its Cartesian coordinates are known. Point P is the midpoint between the two matrix points and is given by:

$$P_x=(x_{ij}+x_{nm})/2$$

$$P_y=(y_{ij}+y_{nm})/2$$

By using these values and point (i,j) in the equation for a plane we find the Z coordinate for the point at P as, $$P_z Z_{ij}-[L_{ij}(P_x-X_{ij})+M_{ij}(P_y-Y_{ij})]/N_{ij}$$

Where $Z_{ij}$ is the height of the previous point. Using the equation of a plane for the plane containing the unknown height we obtain, $$Z_{mn}=P_x+[L_{mn}(P_x-X_{mn})+M_{mn}(P_y-Y_{mn})]/N_{mn}$$

After each height calculation, check whether the geometric pattern condition is fulfilled. If it is, begin a new summation for a new saw-tooth from a new base point.

What is left is to continue these calculations for the next neighboring points according to the geometric pattern conditions until all the surface heights are calculated.

Figure 13A:
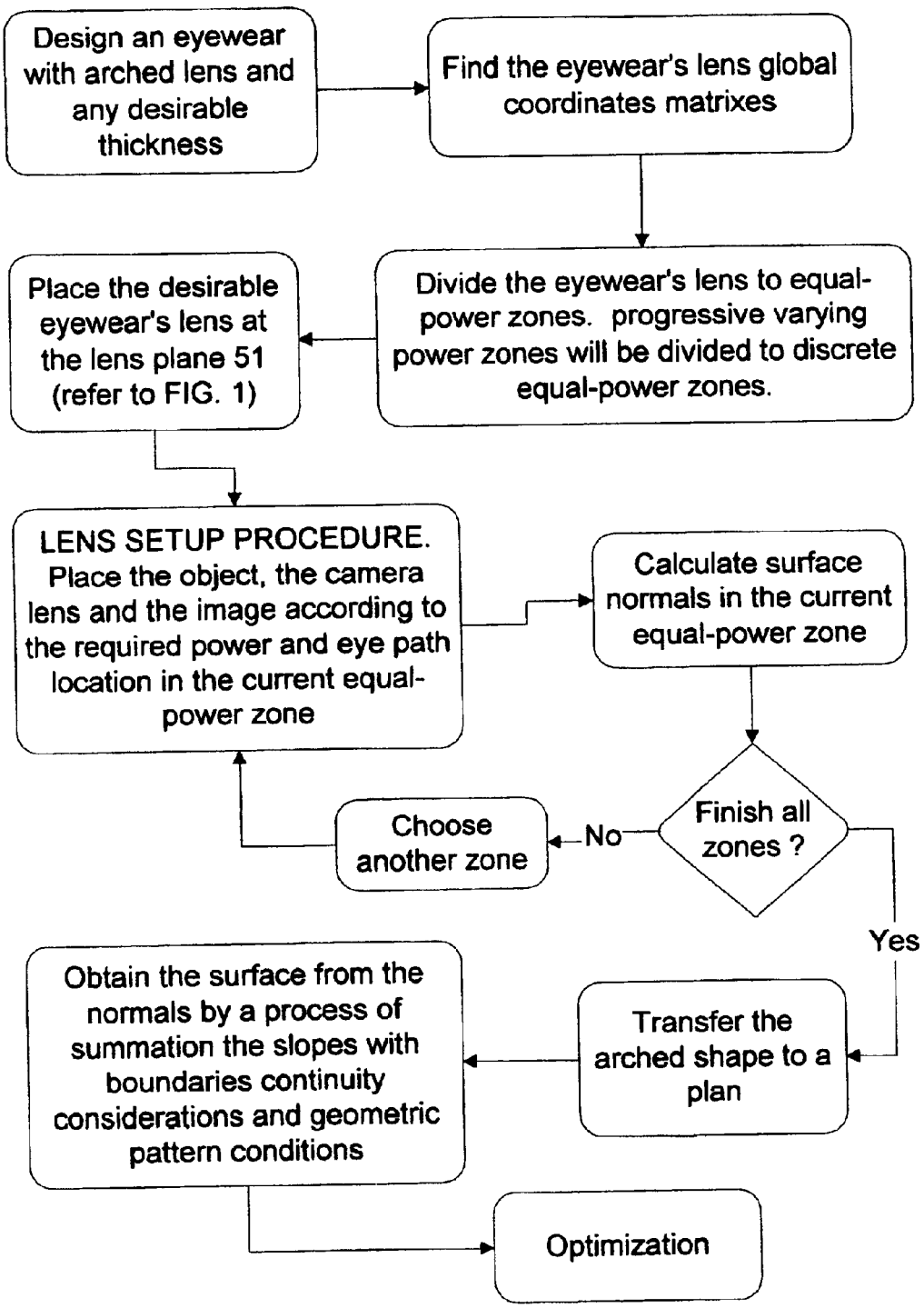
FIG. 13A is a flow-chart that summarize the design process of a Stand-alone type Flat-Thieberger-design-lens.

FIG. 13A is a flow-chart that summarizes the design process of a Stand-alone type Flat-Thieberger-design-lens.

It is obvious that the transformation of the arched shape to flat shape can take place after the normals summation process, or before the normals summation process (as shown above), or before calculating the normals to the surface by making the required changes in the Ray-tracing. There are cases (for instance, eyewear with large angular viewing range) where the manufacturer may consider a design that allows changing the geometric pattern conditions according to changes of the eye-pass.

Exact Ray-tracing that will take in account the height changes caused by the normal summation process and the surface transformation can optimize the design. Another possible optimization is to use a more accurate image or a more accurate eye-model.

When the saw-toothed surface is very dense, a diffractive optimization can be made in purpose to reduce the diffractive aberrations. This is done by using the geometric pattern conditions for changing the distances between the saw-teeth in such a way that will minimize the destructive diffraction effect.

Each saw-tooth can be smoothed through known smoothing algorithms.

2. The Design Process of Add-on Flat-Thieberger-design-lens

The purpose of Add-on type Flat-Thieberger-design-lens is to convert an unprescription arched eyewear to a prescription eyewear, or to change one or more optical characteristics of a prescription arched eyewear. As the surfaces of the Flat-Thieberger-design-lens will be fitted to the eyewear more accurately, there will be less aberrations.

Figure 14:
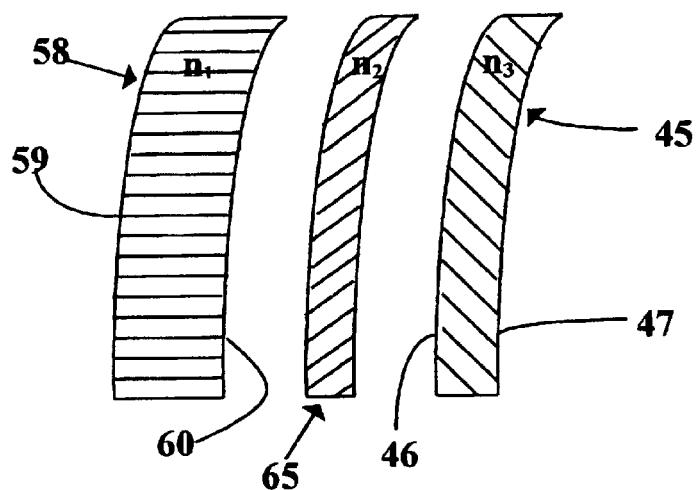
FIG. 14 is a cross sectional exploded view of an Add-on type Flat-Thieberger-design-lens, adhesive, and eyewear.

FIG. 14 shows a cross section exploded view of an Add-on type Flat-Thieberger-design-lens 45 that is bonded to an eyewear 58 by a thin layer of uniform thickness adhesive 65. After folding the Flat-Thieberger-design-lens, Surface 46 is very similar to surface 60 (of the eyewear).

The design process of add-on type Flat-Thieberger-design-lens is similar to the design process of Stand-alone type, and goes as follows:

Step #1: As Stand-alone type.

Step #2: Referring to FIG. 14, after folding, surface 46 is matching to the eyewear's surface 60.

Steps #3–4: As Stand-alone type.

Figure 15:
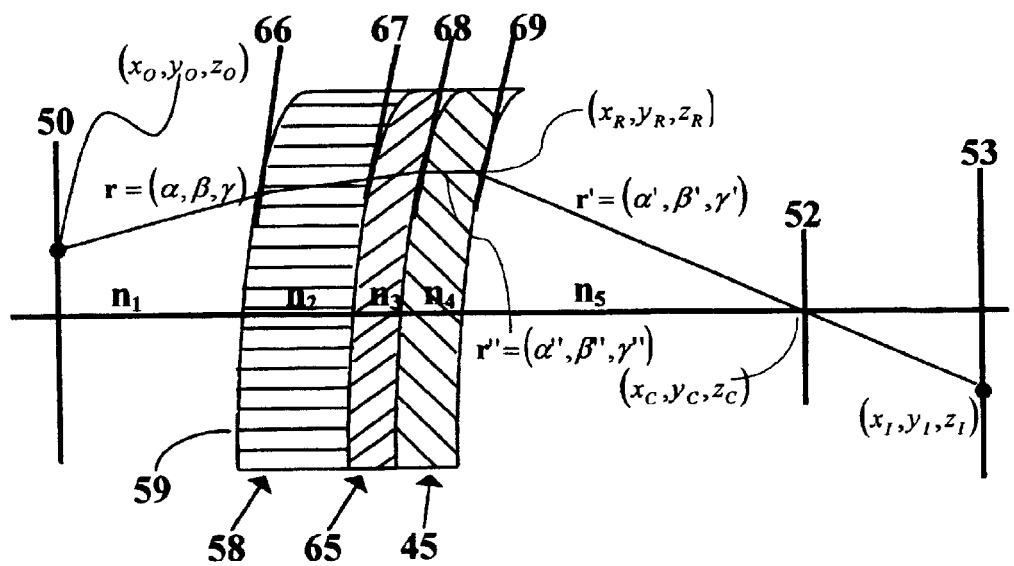
FIG. 15 is a schematically representation of tracing the chief-ray through an Add-on type.

Step #5: LENS SETUP procedure. Referring to FIG. 1, Place the eyewear lens 58 and the adhesive 65 and the folded Add-on lens 45 at the lens plane 51 as shown in FIG. 15.

Choose an equal-power zone and according to the required eye path and the required power of that equal-power zone, place the object, the camera lens and the image.

Step#6: Referring to FIG. 15, r'=(α',β',γ') derived from points $(x_1,y_1,z_1)$ and $(X_C,y_C,z_C)$. 66, 67, 68 and 69 are the tangents to the surfaces at the intersection points. Point $(x_R,y_{R,z_R})$ is the intersection point between the vector defined by points $(x_1,y_1,z_1)$ and $(x_C,y_C,z_C)$ to the rear surface of the Add-on lens which is specified by the surface's coordinate matrix. Tangents 66, 67, and 68 are known. r" can be obtain by few iterations consist of: 1. Guess r=(α,β,γ), calculate all the intersection points using Snell's low. 2. Is the intersection point of r" with the rear surface is $(x_R,y_R,z_R)$?.

The normal to the rear surface $S_R$ is obtained by solving Snell's law for $S_R$ $n_5(S_R \times r')=n_4(S_R \times r")$.

Steps #7–10: As Stand-alone type.

Figure 13B:
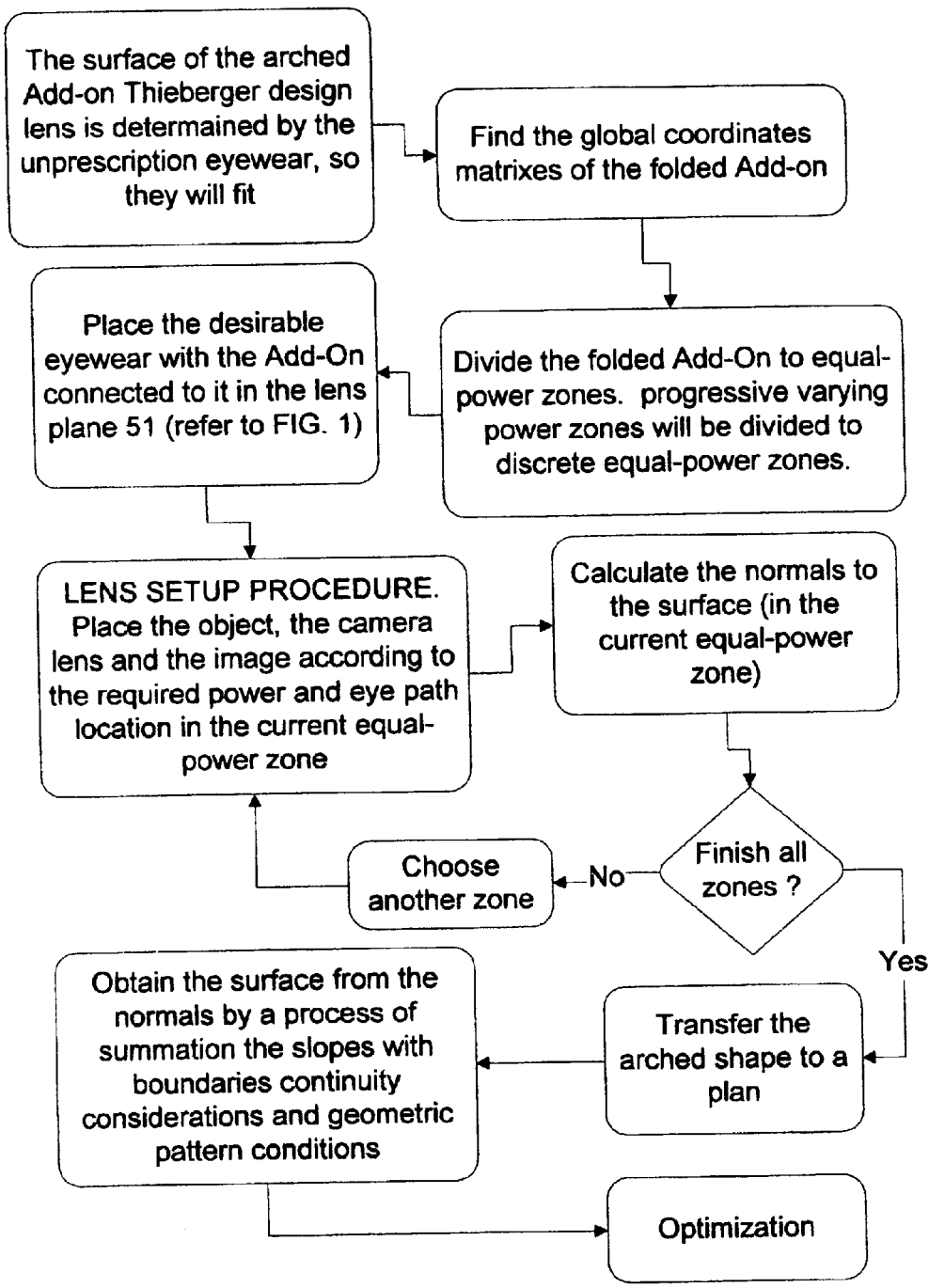
FIG. 13B is a flow-chart that summarizes the design process of an Add-on type Flat-Thieberger-design-lens.

FIG. 13B is a flow-chart that summarizes the design process of an Add-on type Flat-Thieberger-design-lens.

3. The Geometric Pattern Conditions

Figure 6:
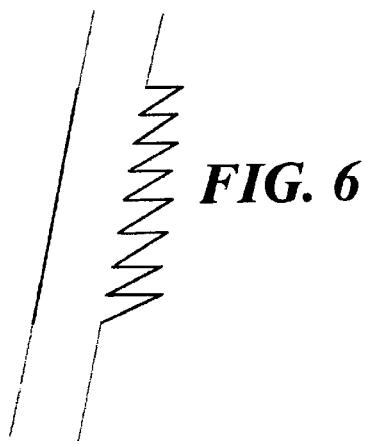
FIG. 6 is a cross sectional view of Flat-Thieberger-design-lens with one saw-toothed surface. The other surface is smooth.
Figure 7:
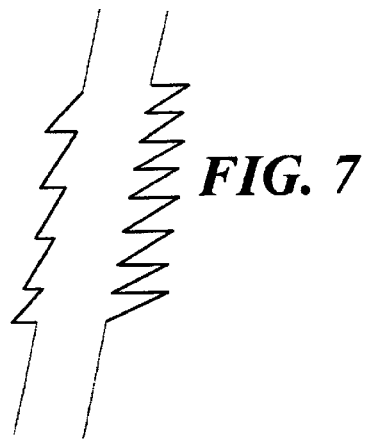
FIG. 7 is a cross sectional view of Flat-Thieberger-design-lens where both surfaces are saw-toothed.

Flat-Thieberger-design-lens has at least one surface that looks like a saw-toothed surface as shown in FIGS. 6 and 7. Referring to FIG. 10, as H is smaller, the lens can be made thinner, but the density of the saw-teeth increases and as a result, the diffraction aberrations increases, and vice versa. The geometric pattern conditions determine how the discontinuity lines will look like by using any appropriate considerations.

The preferred embodiment of geometric pattern conditions can be divided to three main groups:

1. Condition on H.
2. Geometric condition.
3. Combination of the previous conditions.

Condition on H (refer to FIG. 10) is the maximum height permitted to each saw-tooth. The slopes summation process will proceed until the condition [H>maximum$_{13}$ permitted$_{13}$ high] is true. Then there will be a discontinuity and a new summation process for a new saw-tooth will begin from a new base point 63 (which is defined by the designer). When the condition on H is constant, the lens maintains a generally uniform thickness over the entire surface. The disadvantage of this constant condition is that the viewed geometric pattern of the lens (when H is big enough to be visible) may be not aesthetic.

Geometric condition is the technique that cures the aesthetic problem of condition on H. In that condition, the summation process continues until a predefined border. The predefined border is determined by the designer, thus the designer can control the geometric pattern of the discontinuities. The disadvantage of this condition is that there is no control of the saw-teeth height.

The preferred Geometric pattern condition embodiment is a combination of condition on H and geometric condition. By a combination of those conditions, we can control on the viewed geometric pattern, and at the same time control on the maximum height of the saw-teeth.

Figure 16A:
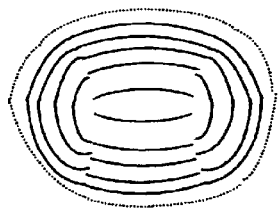
FIG. 16A is an example of a front plan view of the geometry pattern produced by using condition on H.
Figure 16B:
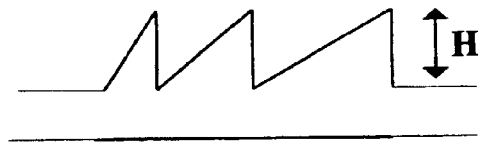
FIG. 16B is a cross sectional view of FIG. 16A.

FIG. 16A shows an example of the viewed geometry of condition on H. FIG. 16B is a cross section view of FIG. 16A.

Figure 17A:
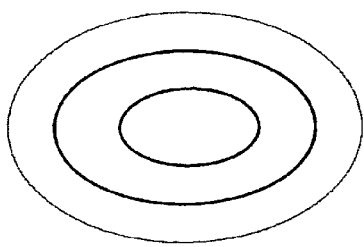
FIG. 17A is an example of a front plan view of the geometry pattern produced by using geometric conditions.
Figure 17B:
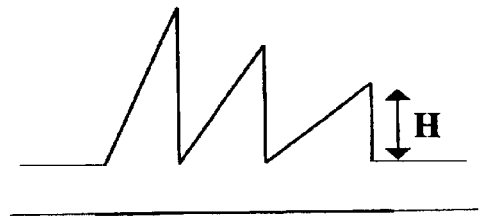
FIG. 17B is a cross sectional view of FIG. 17A.

FIG. 17A shows an example of the viewed geometry of geometric condition. FIG. 17B is a cross section view of FIG. 17A.

Figure 18A:
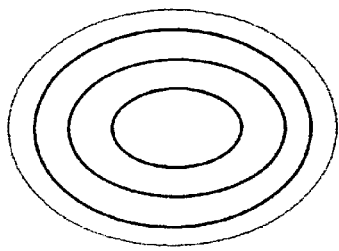
FIG. 18A is an example of a front plan view of the geometry pattern produced by using a combination of both conditions.
Figure 18B:
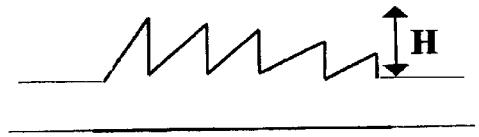
FIG. 18B is across sectional view of FIG. 18A.

FIG. 18A shows an example of a combination of both conditions. FIG. 18B is a cross section view of FIG. 18A.

Combination of condition on H and geometric condition can be a very powerful tool that enables the designer to "draw" almost any shape on the lens.

It is to be understood that the above described process is just an illustration of the principle process. There are however, innumerable modifications and changes which may be devised by those skill in the art which may embody the principles of the process and fall within the spirit and scope thereof. The following examples demonstrate possible modifications.

EXAMPLE #1

Design process of distance viewing Add-on Flat-Thieberger-design-lens.

Figure 19:
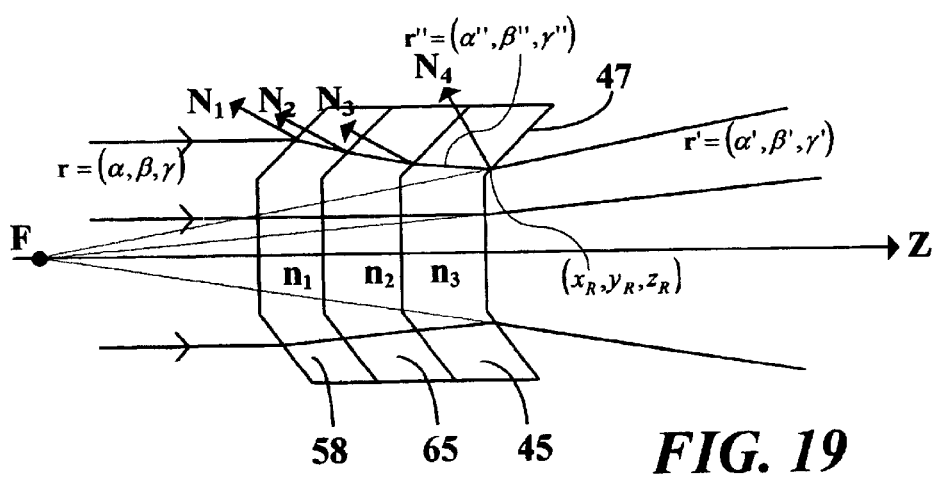
FIGS. 19, 20 show two possible modifications to the design process.

FIG. 19 is a cross section view of a possible system 58 is the eyewear. 65 is the adhesive and 45 is the Flat-Thieberger-design-lens. Z-axis coincident with the eye-pass. F is the focal point. 47 is the saw-toothed surface. All the rays from an object at infinite assumed to be parallel to Z-axis. The normals $N_1, N_2, N_3$ to each point on the surfaces are known.

Step #1: $N_1, N_2, N_3$, r are known. r" and the intersection point $(x_R, y_R, z_R)$ can be calculated by using Snell's low. From $(x_R, y_R, z_R)$ and F we derive r'. $N_4$ is obtained from $(N_4 \times r') = n_3(N_4 \times r'')$.

Step #2: Repeating step #1 until the density of the calculated normals is sufficient.

Step #3: Transform the normals to the arched surface to normals to a flat surface.

Step #4: Obtain the surface from the normals by a process of summation the slopes with geometric pattern conditions.

EXAMPLE #2

Figure 20:
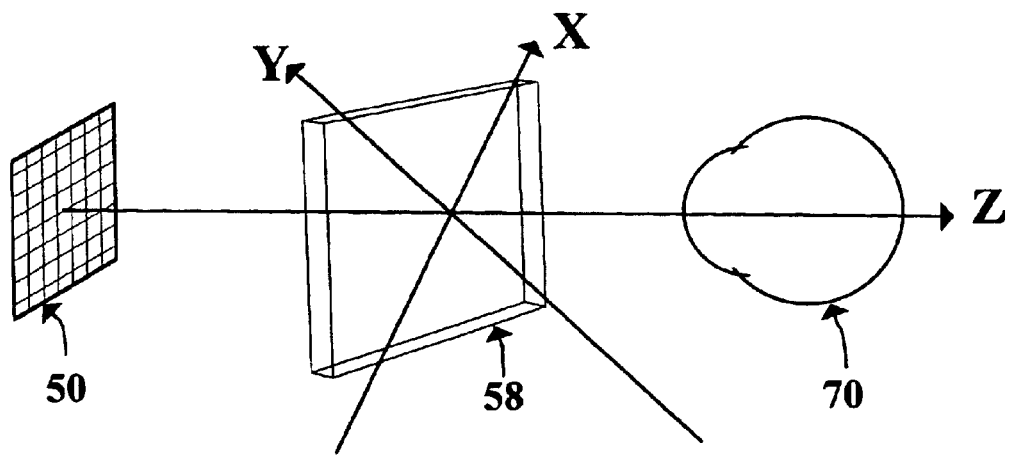

The normals to the arched surface can be calculated by using one of the well know in the art models of astigmatic human eye. Referring to FIG. 20, the locations of all the system parts (i.e., the object 50, the corrective eyewear lens 58, and model of the astigmatic eye 70) are known. The desired image (of the object) on the retina is known from the eye model. The defocus blur image formed by the astigmatic eye (without corrective lens 58) on the retina is known from the eye model. By using Ray-tracing technique, and taking in account the movements of the eye, we can calculate the required microscopic normals of the corrective lens 58 so that the astigmatic effect of the corrective lens optimally cancels the astigmatic effect of the eye, and by that, the desired image will be formed on the retina. The surface is obtained from the transformed normals and geometric pattern conditions The distances of the object from the eye are one of the parameters that determine the corrective lens type. For unifocal lens, the object distance is the same over the entire field of view. For multifocal and progressive lenses, the object distances and orientations depend on the viewing zone and the viewing direction of the eye.

EXAMPLE #3

There are many more possibilities to solve the well know mathematics problem of obtaining a surface from its normals (step #10). For example, each saw-tooth can be calculated by using iterative algorithms of high order polynomials with continuous partial derivatives at the boundaries (between the normals). Each saw-tooth can be smoothed through spline analysis or technique in such a manner, etceteras.

EXAMPLE #4

The decision when to begin a new summation of the slopes for getting a new saw-tooth may depend on the image quality by using iterative algorithm. The discontinuities will be chosen in such a way that the image blur, or any other image quality criterion, will be reduce to the minimum possible and by that produce the best available image quality for the pre-selected macroscopic shape of the lens and pre-selected limitations on the saw-teeth, such as, for example, maximum height or size for each saw-tooth. Surface durability and tolerance budgeting methods may be used the same way.

4. Protected Flat-Thieberger-design-lens

Figure 21:
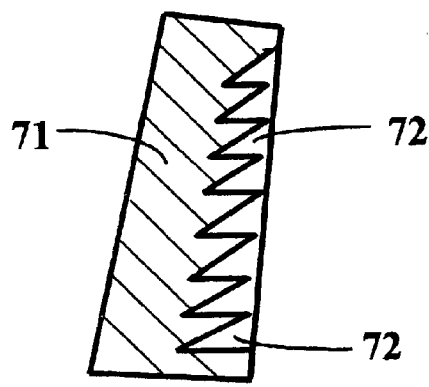
FIG. 21 is a cross sectional view of a protected Flat-Thieberger-design-lens.

When we wish to avoid a saw-toothed surface or to protect the facets from dirt or damage, we may consider a number of possible modifications as shown in FIGS. 21–24 wherein the saw-toothed surface is protected by protective means. Referring to FIG. 21, Flat-Thieberger-design-lens 71 has its saw-toothed surface imbedded in an optical media 72, which has a different index of refraction than Flat-Thieberger-design-lens 71, and can be made smooth. That embodiment can be made, for example, by filling the saw-toothed surface with a material having a different refraction index or by ion-implantation techniques. In the case of laminated or Add-on type wherein the layer has one saw-toothed surface and the other smooth, the saw-toothed surface can be placed in the inner side (of the composite lens) and then the protecting material 72 will be the adhesive.

Figure 22:
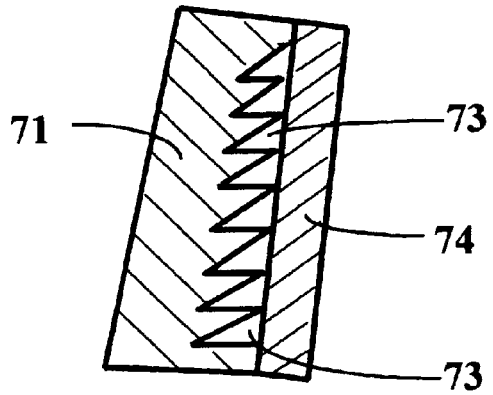
FIGS. 22–23 are cross sectional views of partially hollow protected Flat-Thieberger-design-lenses.

FIG. 22 shows a partially hollow protected Flat-Thieberger-design-lens, which is made of a lens 71 and a protective layer 74. Spaces 73 containing vacuum or filled with captive gas or liquid that has a different refraction index than 71 and 74. 74 can also be the eyewear in the case of Add-on type Flat-Thieberger-design-lens.

Figure 23:
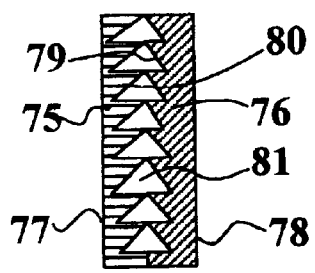

FIG. 23 shows a partially hollow protected Flat-Thieberger-design-lens which is made of a front lens 75 and a back lens 76. Surfaces 77 and 78 are defined by the designer. 79 and 90 are the saw-toothed surfaces. Space 81 is filled with captive gas, vacuum, liquid, or any other appropriate material that have a different refraction index than lenses 75 and 76.

Figure 24:
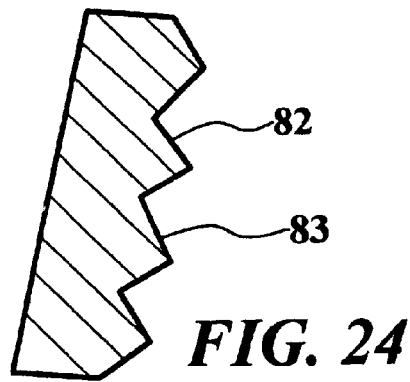
FIG. 24 is a cross sectional view of a protected multifocal Flat-Thieberger-design-lens.

It is known in the art that under certain circumstances, the brain can discriminate between separate competing images by accepting the in-focus image and rejecting the out of focus image. Thus, a lens containing at least one near correction focal and one far correction focal can be constructed from a plurality of zones which vary from far vision correction 82 to near vision correction 83, then back to far correction, and again to near, or vice versa. FIG. 24 shows the result lens which is not smooth, but has less sharp facets (the discontinuity is reduced). That construction can be obtained by using condition on H. Each time the condition is fulfilled, we begin to sum up a new saw-tooth but of other focal length and from the same height.

In a case where we want to keep the various image brightness at each of the focal points substantially equal in intensity, or with constant ratio, we have to divide the zones with appropriate ratio (by using geometric conditions). Usually, this division will be expressed in sharpener facets and more discontinuities (but still it will be more continuous than a unifocal lens).

5. Flat-Thieberger-design-mirror

The design process of Flat-Thieberger-design-mirror is similar to the design process of Flat-Thieberger-design-lens. For purposes herein the flat-Thieberger-design-lens, optical surfaces, prescription optical surfaces are refer to, terms are meant to include the flat-Thieberger-design-mirror embodiment FIG. 25 shows a combined Flat-Thieberger-design-lens-mirror system. 86 is the arched lens, 87 is the mirror. FIG. 26 shows an elastic Flat-Thieberger-design-mirror. The reflective surface 84 is made of Retroreflectors (the angles are so that total internal reflection occurs) which enable the mirror to be elastic and not fragile. The mirror may be coated with a protective layer that protects it against environmental conditions and/or against changes in the arched shape after adding the reflecting layer. The mirror may be fixed in a frame that prevents changes in the arched shape after adding the reflecting layer.

6. Methods for Cost Reduction

It does not appear to be economical and practical to produce a unique set of Add-on Flat-Thieberger-design-lenses to each eyewear. Disclosed five preferred methods for adapting/converting between surfaces, which are not matching after the prescription lens is folded to its predefined arched shape. Method #6 reduce the number of molds needed to be made when producing molded multifocal Flat-Thieberger-design-lens.

FIG. 14 is an exploded view of Add-on type Flat-Thieberger-design-lens. For simple and consist explanation, assume that:

1. Surface 46 is smooth and surface 47 has one or more saw-toothed zones.
2. After folding the flat prescription lens to its predefined arched shape, surface 46 is not matching to surface 60 (i.e., they don't fit), but is similar to s matching surface.

It has been found that a little distortion to the saw-toothed surface 47 (caused by the fact that surface 46 is not initially matching to surface 60) cause more aberrations than a little distortion to surface 46 (the smooth surface). The following 3 methods take advantage of that fact.

Method #1: Referring to FIG. 27, adhesive 65 is used as an adapter between the arched Flat-Thieberger-design-lens to the eyewear. The adapters purpose is to prevent distortions to surface 47. The adapter is made of adhesive that has varying thickness. Surface 88 is matching to surface 60; surface 89 is matching to surface 46. The adapter may have the same refraction index as that of the Flat-Thieberger-design-lens.

Method #2: The adapter of Method #1 can be made of adhesive and a thin, not fragile, polymer which has equal or nearly equal refraction index as the adhesive.

Method #3: Flat-Thieberger-design-lens can adhere to arched surfaces which are not matching, but similar to its pre-defined surface shape.

Method #4: The adhesive 65 may cover only selected parts of the lens, as shown for instance in FIGS. 28A–B. This method has two main advantages: 1. The flow zone or zones 91 (the zones that are not bonded) don't have to be matching. 2. The laminating process is simplified because air is separating between the lenses.

Method #5: When the former methods are not sufficient, we can make a special converting layer which will be called herein "the universal converter". The universal converter can adapt between any arched Add-on Flat-Thieberger-design-lens to any arched or not arched eyewear surface. The universal converter is usually a not arched Thieberger-design-lens. The macroscopic shape of the universal converter is designed such that one of its surfaces is initially matching to the eyewear, and the other surface is initially matching to the required arched Add-on Flat-Thieberger-design-lens shape. The microscopic structure of the universal converter is designed to imitate the original eyewear, which the arched Add-on was designed to, and cancel the aberrations caused by the non-matching eyewear. The universal converter is a very powerful tool because it enable us to convert, with only one converting layer, a whole kit of Add-on Flat-Thieberger-design-lenses which is adapted to a specific eyewear, to be adapted to another eyewear and/or different pupil location.

Method #6: Modern computer controlled cutting machines art accurate enough to enable the assembly of a mold from plurality of interchangeable mold-segments. The term "mold" as used herein is define as a mold used in making Flat-Thieberger-design-lens, or a mold used to make another mold that ultimately used in making Flat-Thieberger-design-lens. Flat-Thieberger-design-lens enable the designer to define the thickness of the macroscopic surface of the lens, therefor, the molds used in making Flat-Thieberger-design-lens can be assembled from a plurality of different power and eye-pass mold-segments, that are bonded and designed to fit together. This method is especially useful when producing two or more different Flat-Thieberger-design-lenses, which have one or more segments that have to be arched to the same shape, or when producing multifocal or progressive Flat-Thieberger-design-lens. For instance, the mold used to manufacture a multifocal can be made from a distance vision mold-segment and a close-up vision mold-segment. When the molding process is finish, the mold-segments may be separated for later reuse in another configuration.

When the arched surface of one lens entirely contains the arched surface of a second lens, it is usually more economical to manufacture only the first lens, and when needed, cut from it the second lens, instead of dividing the mold of the first lens to two or more parts.

7. Laminated Flat-Thieberger-design-lens

Laminate lenses are usually built of a front layer and a rear layer, or from a main front layer and one or more small rear layers, or from plurality of different size and thickness layers.

The preferred design process of laminated Flat-Thieberger-design-lens is-similar to the preferred design process of Flat-Thieberger-design-lens, and goes as follows:

Step #1: How many layers to use ?, How to bond the layers ?, Protected or not protected Flat-Thieberger-design-layers ?

Step #2: What is the desired correction of each layer ?

Step #3: Design the required macroscopic arched shapes of each layer.

Step #4: Calculate the layers' microscopic surface (similarly to the calculation of Flat-Thieberger-design-lens).

Example: FIG. 29A shows a laminated Stand-alone Flat-Thieberger-design-lens, made of three layers 92–94. When the adhesive 65 is thin, the calculation of each layer is very simple. Each layer can be think of as a Stand-alone Flat-Thieberger-design-lens in media which is determined by the layer's boundary media. FIGS. 29B–D shows the layers in their appropriate media. In this manner, we can design a laminated Flat-Thieberger-design-lens containing as many layers as we wish. It is obvious that all the previous cost reduction methods can be used when manufacturing laminated Flat-Thieberger-design-lenses.

All the well known in the art combinations of classical layers (for instance, front layer for distance vision and rear layer for close-up, vocational, etc.) and all the well known in the art laminated lenses types (for instance, multifocal, progressive, special vocation, etc.) can be done with Flat-Thieberger-design-layers. A polarizing layer, or thin filters such as ultraviolet blocking films may be provided between successive layers. Light reflective, or special delicate multilayer interference coatings can be provided on the outside surface, or preferably, provided on one or more of the inside surfaces so that these coatings are protected by the adhesive and layers.

Because of the high cost of the molds used in manufacturing Flat-Thieberger-design-lenses, sometime it is economic to manufacture unifocal laminated Flat-Thieberger-design-lenses too. For instance, assume that we want to make a set of Flat-Thieberger-design-lenses in the range of −12 to +12 diopters with 0.25 diopter intervals. Instead of 12×2×4+1=97 different Flat-Thieberger-design-lenses we can make 12×2+1=25 front layers for all the integer numbers and four rear layers that add 0 or +0.25 or +0.5 or +0.75 when bonded to the front layer. In addition, we can add for example a third cylinder correction layer.

The diffractive aberrations increase with every layer added, therefor when possible, it is recommended to prevent unnecessary overlapping zones of saw-toothed surfaces. For instance, FIG. 30A shows a distance vision layer, FIG. 30B shows the close-up vision layer. 95 and 98 are saw-toothed zones. 96 and 97 are smooth zones. When the layers will be bonded together in purpose to obtain a bifocal, there won't be overlapping saw-toothed surfaces zones, so the diffractive aberrations won't increase.

The Preferred Lamination Procedure

The eyewear retailer is supplied with a kit of Flat-Thieberger-design-layers, each of them having particular correction/s and a serial number. In addition; the eyewear retailer is supplied with tables, which are divided according to the lenses' shape and prescription (including location) and the distance between the lens to the eye.

According to the required shape and prescription, the retailer searches in the tables for the serial numbers and laminating order of the layers he has to laminate.

The axis, center, and orientation may be noted (by nonpermanent means) on each layer.

Prior to laminating, it is important to clean the surfaces which will be bonded.

Figure 31:
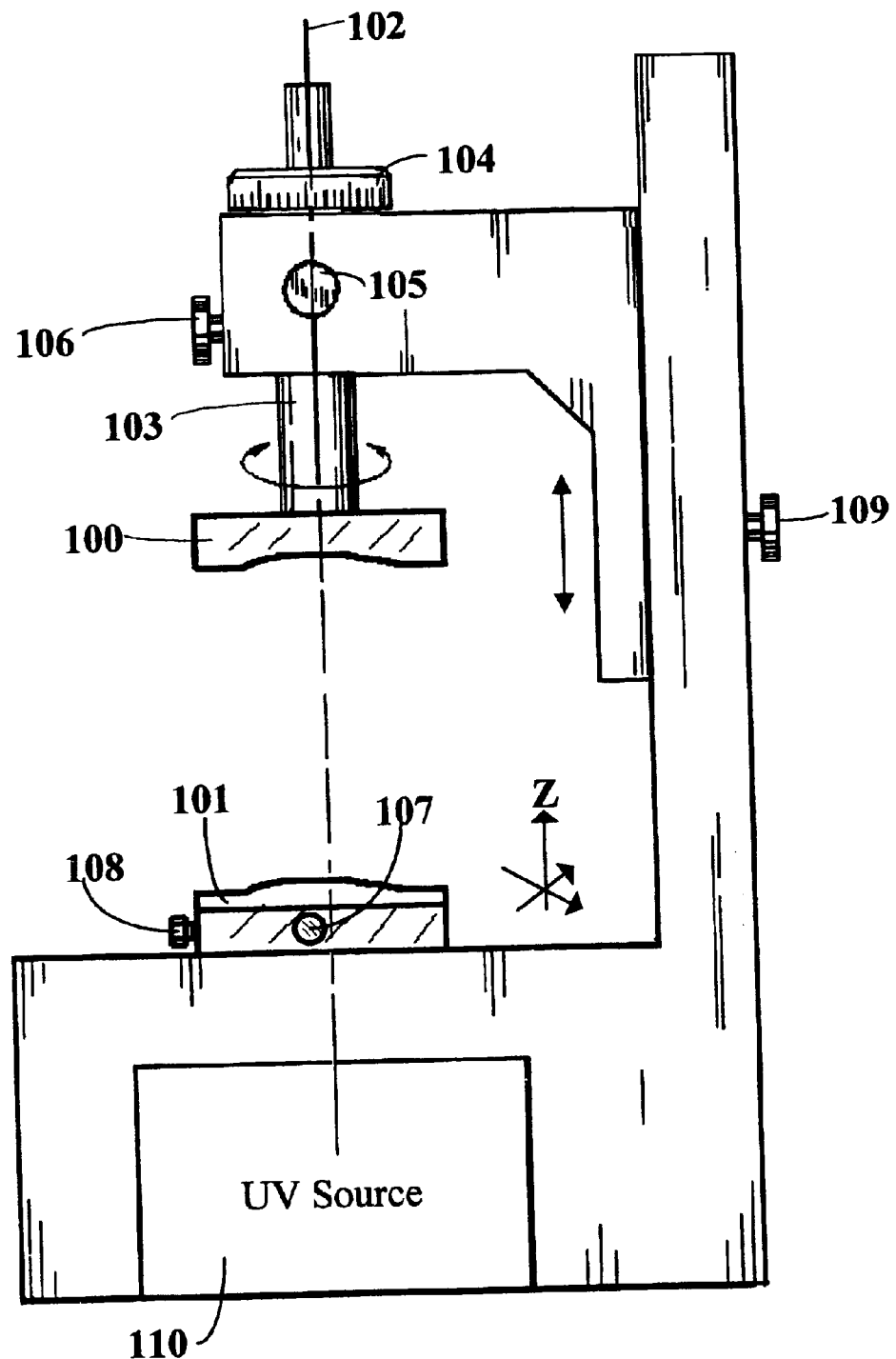
FIG. 31 shows a bonding system for a more accurate and controlled bonding process.

The layers can be bonded together by using tiny pincers and finger pressure, or when more accurate and controlled process is desired, the layers can be bonded together by a bonding system such as FIG. 31. Referring to FIG. 31, holders 100 and 101, which are called hereinafter "lens-holders", hold the front and rear layers (or the eyewear and the Add-on Flat-Thieberger-design-lens, etc.) in the required arched shape. The layer may be connected to the lens-holder by vacuum, or temporary adhesive, or clamp, or any other means. The lens-holders are removable and each layer should have its own adapted lens-holder. Holder 100 moves along the laminating axis 102 to press the rear layer against the front layer. The pressure dispersal is determined by the lens-holders 100 and 101. When accurate control on the pressure is required, 103 can be replaced with a springs system that measures the force.

The positioning of each layer is determined by the lens-holders. Accurate modifications at the (X,Y) plane can be done with screws 104 and 105 and 106. Accurate modifications at the (Z,X) and (Z,Y) planes can be done with screws 107 and 108. Movements along the laminating axis 102 are controlled by screw 109.

For UV adhesives we can add an UV source 110 that cure the adhesive while the layers are pressed together.

Laminated flat, spherical, or toric Fresnel lenses can be made the same way.

U.S. Pat. No. 4,892,403 issued to Merle, disclose a method of making a composite plastic lens from "classical" anterior lens and posterior lens. According to that method, heating the lenses prior to bonding them together, cause a distorted composite lens to return to its original shape and curvature. That method can be applied to Flat-Thieberger-design-lenses manufacturing process too in the case when there are distortions, without the limitation of only two lenses.

8. Additional Preferred Embodiments

Figure 32:
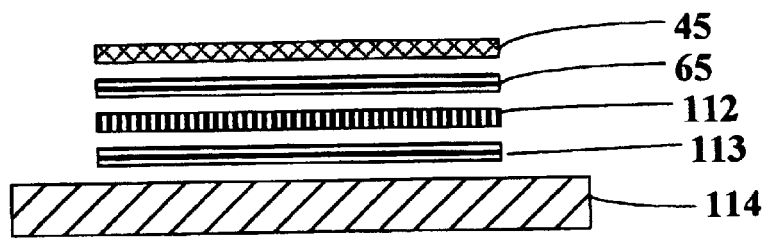
FIG. 32 is a cross sectional exploded view of an Add-on Flat-Thieberger-design-lens and adhesives, as provided to the retailer.

Referring to FIG. 32, Flat-Thieberger-design-lens 45 is backed with a clear, permanent adhesive 65. The adhesive can be protected until use by a clear, non-stick protective covering 112 such as polytetrafluoroethene (Teflon). The non-stick covering may have an extended tab for handling and may itself being backed with a nonpermanent contact cement 113 that holds it temporarily to a carrying surface 114. The carrying surface 114 is used to hold the Flat-Thieberger-design-lens during storage and marketing and notes its parameters. The nonpermanent contact cement 113 can also be used to hold temporarily the lens in place on the eyewear in purpose to persuade the customer to buy the eyewear, by demonstrating the actual article.

Figure 33:
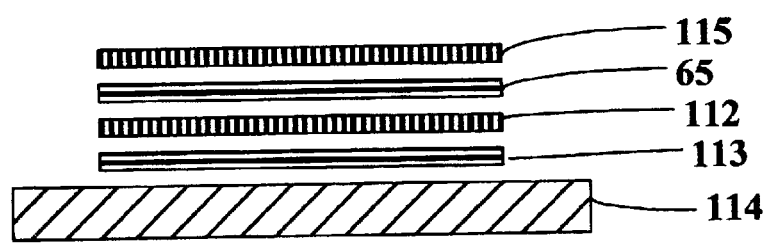
FIG. 33 is a cross sectional exploded view of the adhesive, in the case where the lenses are provided to the retailer as a two pieces kit

The Add-on Flat-Thieberger-design-lens may be provided to the retailer as a two pieces kit containing: lens 45, and adhesive as shown in FIG. 33. 115 is a protective covering such as polytetafluoroethene. The permanent adhesive 65 may be of a composition which allows the lens to be removed from the eyewear with a solvent.

In an alternate embodiment, Flat-Thieberger-design-lens does not cover the eyewear's entire surface but only a part of it. In that case, The contact cement 113 can also be used to determine the optimally position it is to be placed permanently, and there may be a note, pointing the central axis.

Figure 34:
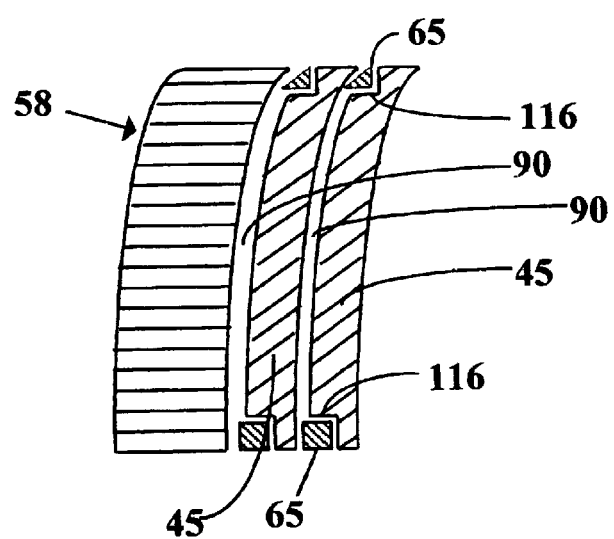
FIG. 34 is a cross sectional exploded view that shows the recesses used for reducing the gap between the layers.

In an alternate embodiment, the permanent adhesive 65 does not cover all the lens' surface, but only a part (preferably the edge) or parts of it. FIG. 28A is an exploded view of a narrow adhesive connector that covers only the edge as seen in FIG. 28B. In the middle, there is a gap 90 contains gas or liquid. In purpose to reduce the gap 90 between the lenses, Flat-Thieberger-design-lens may have recesses 116 for the adhesive, as shown in FIG. 34. The gap 90 between the eyewear 58 to Flat-Thieberger-design-lens 45 and between the Flat-Thieberger-design-lenses is reduced due to the recesses 116. This embodiment simplifies the design process and simplifies the assembly of laminated lenses (which are calculated as attached ideal thin "classical" lenses).

In another preferred embodiment, the saw-toothed surface covers only one or more zones of the lens.

In another preferred embodiment, Flat-Thieberger-design-lenses are enough soft and thin to enable peoples to cut and shape their lenses as they wish, with simple cutting accessories such as scissors and the like. Those lenses are formed of a not fragile organic material. The lenses may be marked or covered with a non-stick covering that notes the lens parameters such as eye-pass, different vision zones, axis, power, cylinder location, etc. FIGS. 35 A–D show the preferred using procedure.

Figure 35A:
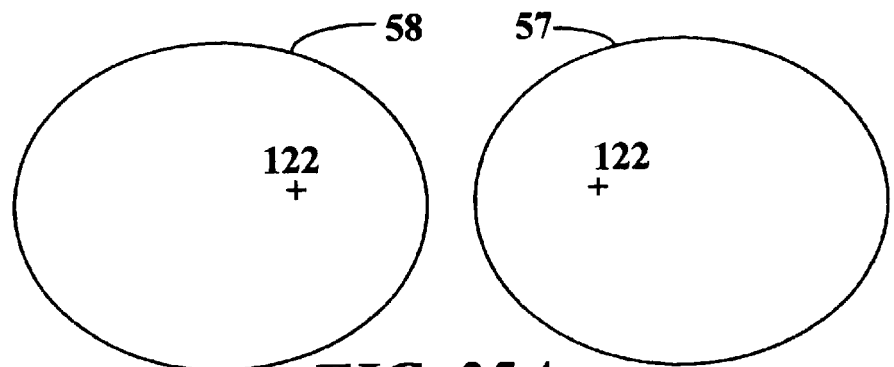
FIGS. 35 A–D show the preferred using procedure for the cutable Flat-Thieberger-design-lenses.

Step #1: The customer chooses a frame with arched lenses. Referring to FIG. 35A, the optician selects the appropriate Flat-Thieberger-design-lenses (57, 58). The '+' sign 122 indicates the main axis.

Figure 35B:
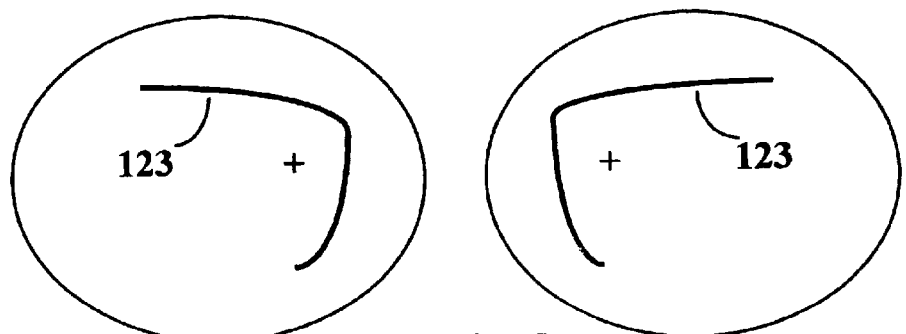

Step #2: Referring to FIG. 35B, according to the desired frame (which determine the arched shape of the lens) and the pupils distance and location, the retailer draws a line 123, lines, or dots (depending on the frame type). Those lines or dots, notes where the lens has to be connected to the frame, and because of that, the customer is forced the cut the lens according to them.

Figure 35C:
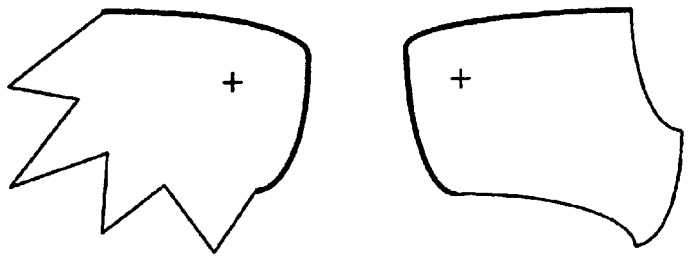
Figure 35D:
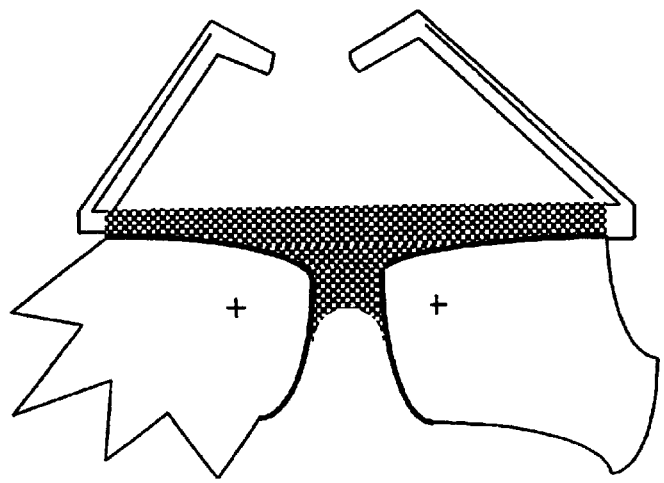

Step #3: Referring to FIG. 35C, The customer cuts the lenses to any shape he wants. The only limitations are the edges 123, which were drawn by the retailer and indicate where the lens has to be connected to the frame.

Step #4: Connect the lenses to the frame, see FIG. 35D. The same can be done with Fresnel lenses too.

9. Manufacturing and Materials

Most of the well known in the art manufacturing processes appropriate for manufacturing Fresnel type lenses and/or diffractive Fresnel type lenses and/or light splitters are suitable for manufacturing Flat-Thieberger-design-lenses. The decision when to use a specific method is mainly depended on the desired shape, characteristics, saw-teeth height, material and number of required units. Usually the preferred fabrication technique for plastic Flat-Thieberger-design-lens is Compression molding or injection molding.

It is envisioned that there are many accurate numerically controlled machines can be adapted to make the Flat-Thieberger-design-lens simply by installing appropriate software or by converting the surface heights to a format from which the machine can read from Most of the well known in the art materials appropriate for manufacturing flexible Fresnel lenses are suitable for manufacturing Flat-Thieberger-design-lens. Thus, when we want to make elastic, or shook resistant, or rigid, etceteras, Flat-Thieberger-design-lens, we may use the well known in the art materials used for produce a similar Fresnel type lens with similar characteristics.

When Thieberger-design-lens is made of plastic, attention to mold design, finish, maintenance, and close process controls is essential. In addition, the shrinkage of the plastic must carefully be accounted for in the mold design.

The characteristics of the lens material should determine whether the lens folding is a part of the manufacturing process or whether the lens can be folded after the lens manufacturing process is completed.

All the adhesives used in this application are well known in the adhesives and cements art.

For purposes herein, the flat-Thieberger-design-lens term is meant to include the flat-Thieberger-design-mirror embodiment.

Although the invention has been shown in terms of preferred embodiments, it will be apparent to those of skill in the art that numerous modifications and variations and adaptations of the present invention to various usages and conditions may be made without departing from the true spirit and scope thereof, as set forth in the accompanying claims. Thus, For example, instead of the coordination matrixes, the lens can be represented by high-order polynomials. In addition to adhesive, Flat-Thieberger-design-lens can be connected to an eyewear by any mechanism such as vacuum, clip-on mechanism, brackets, pressure, thin wires, or any other "lens holders" which capture it to the eyewear or to the eyewear frame. In addition, the term "arched" is not limited to shapes that can be made by folding a flat sheet. In accordance with the present invention, the designer can design a prescription lens that will be manufactured in any desired shape and folded to any other required shape.

Although the present invention has been described primarily in terms of ophthalmic applications, it should be understood that the invention is not limited, but encompasses a wide variety of arched optical lenses applications which can be made lighter, thinner, in new arched shapes which were not possible in the past, with less aberrations, with improved optical characteristics such as multifocal instead unifocal, progressive instead of unifocal or multifocal, etc. For example, infrared devices, lenses for cameras, projectors, telescopes, field glasses, and the like optical devices can be made in accordance with the present invention with the same benefits described for eyewear applications.

Numerous combinations of preferred embodiments and/or their modifications may be made without departing from the true spirit and scope. The terms, expressions, and processes which have been employed in this application are used herein as,terms of description and not of limitation, and thus there is no intention, in the use of such terms, expressions, and processes, of excluding equivalents of the features shown and described, or portions thereof, it being recognized that the scope of the invention is defined and limited only by the following claims.

I claim:

1. A method of making a prescription optical device, having a predetermined prescription when curved to a predetermined arched shape, comprising a prescription saw-toothed surface zone, having plurality of discontinuities, comprising the steps of:
   a) calculating the surface heights of the arched prescription surface zone in accordance with said predetermined prescription,
   b) transforming said surface heights of said arched surface to surface heights of a flat surface.

2. The method of claim 1, further comprising the steps of:
   a) checking whether a predetermined condition for having a surface discontinuity is fulfilled,
   b) repeating the process when said predetermined condition is fulfilled.

3. The method of claim 1, wherein said predetermined condition for having a surface discontinuity is the height of said discontinuity, the microscopic shape of the surface, the viewed geometric pattern made by said discontinuities, a diffraction consideration, quality of the formed image, cosmetic factors, grinding technique, manufacturing technique, surface durability, tolerance budgeting methods.

4. The method of claim 1, wherein the calculation of said arched surface heights comprises:
   a) calculating microscopic normals to said arched surface, whereby said microscopic normals produce the required prescription, b) calculating the surface heights of said arched surface from said calculated microscopic normals.

5. The method of making a prescription saw-toothed surface zone according to claim 1, wherein said plurality of discontinuities are protected by protective means.

6. The method of making the prescription optical device according to claim 1, wherein said prescription optical device is an ophthalmic lens.

7. The method of making a prescription optical device according to claim 1, wherein said prescription optical device is made as a mirror.

8. The method of making a prescription saw-toothed surface zone according to claim 1, comprising the further step of utilizing a numerically controlled machining operation, which uses said calculated surface heights, for manufacturing said flat surface zone.

9. The method of making a prescription saw-toothed surface zone according to claim 1, comprising the further step of utilizing a numerically controlled machining operation, which uses said calculated surface heights with the required changes, for manufacturing a mold used in making said flat surface zone.

10. The method of claim 9, wherein said mold is assembled from a plurality of different power and eye-pass mold-segments, that are bonded and made to fit together, wherein said mold-segments may be separated and reused with the same segments or with other appropriate segments.

11. The method of making a prescription optical device according to claim 1, wherein said prescription optical device is formed of a not fragile organic material that is sufficiently thin and soft to enable cutting by a simple cutting means.

12. The method of making a prescription optical device according to claim 1, wherein said prescription saw-toothed surface zone is made of a first material and said prescription optical device further comprising a second material.

13. The method of claim 12, wherein the combination of said first and second materials correct aberrations of said prescription optical device.

14. The method of making a prescription optical device according to claim 1, wherein said prescription optical device is a laminated optical device having at least one anterior optical element having a first corrective feature and at least one posterior optical element having a second corrective feature, comprising:
  a) at least one anterior or posterior optical element having a predetermined prescription when curved to a predetermined arched shape, comprising a prescription saw-toothed surface zone, having plurality of discontinuities,
  b) joining said anterior and posterior optical elements by bonding means, wherein, when joined and curved, form a laminated optical device having said required prescription.

15. A method of changing at least one optical characteristic of an arched optical device by means of bonding or attaching or securing or joining to said arched optical device at least one prescription optical-element having at least one surface zone made according to claim 1 that is designed, after curving, to substantially match an appropriate surface zone of said arched optical device.

16. The method of claim 15 wherein said arched optical device is an eyewear and said optical-element is an ophthalmic lens.

17. The method of claim 15, wherein said prescription optical-element having a predetermined prescription when curved to a predetermined arched shape is protected by protective means.

18. The method of claim 15, wherein said optical-element is bonded to said arched optical device by using adapting or converting means.

19. The method of claim 15, wherein the surface that has to be bonded to said arched optical device is backed with an adhesive and said adhesive is being protected by a removable non-adhesive sheet.

20. An optical device having at least one saw-toothed surface zone comprising saw-teeth, characterized by the fact that it is curved to a predetermined shape to become a prescription optical device, and after curving said optical device to said predetermined shape, the principal curvatures and the principal curvatures directions are such that the light rays are refracted according to a required predetermined prescription.

21. The prescription optical device of claim 20, wherein said saw-teeth are arranged according to the height of said saw-teeth, the microscopic shape of said saw-teeth, the viewed geometric pattern made by said saw-teeth, a diffraction consideration, quality of the formed image, cosmetic factors, grinding technique, manufacturing technique, surface durability, tolerance budgeting methods.

22. The prescription optical device of claim 20, wherein said optical device is a protected optical device.

23. The prescription optical device of claim 20, wherein said optical device is made as an ophthalmic lens.

24. The prescription optical device of claim 20, wherein said optical device is made as a mirror.

25. The optical device of claim 20, wherein said optical device is a laminated arched optical device having at least one anterior optical element having a first corrective feature and at least one posterior optical element having a second corrective feature, comprising:
  a) at least one anterior or posterior optical element characterized by the fact that it is curved to a predetermined shape to become a prescription optical device such that the light rays are refracted according to said required predetermined prescription,
  b) said anterior and posterior optical elements are connected by bonding means, wherein, when connected and curved, form a laminated arched optical device having said predetermined prescription.

26. A prescription ophthalmic lens having at least one saw-toothed surface zone comprising saw-teeth, characterized by the fact that after curving said ophthalmic lens to a predetermined arched shape, for almost every intersection of said saw-tooth surface with a viewing-angle, the curvatures and the curvatures directions are such that the prescription of said arched ophthalmic lens and the disorder of the eye to be corrected are substantially individually corrected and adapted to each other as to direction and extent.

27. The ophthalmic lens of claim 26 wherein said curvatures are the principal curvatures and said curvatures directions are the principal curvatures directions.

28. The ophthalmic lens of claim 26, wherein said ophthalmic lens is a protected ophthalmic lens.

29. The ophthalmic lens of claim 26, further comprising at least one additional surface zone, which does not necessarily have to be folded or curved, that is made according to smooth prescription ophthalmic lens specifications.

30. The ophthalmic lens of claim 26, wherein, after curving said ophthalmic lens, one of said ophthalmic lens surfaces is substantially matching to a surface zone of an arched eyewear.

31. The ophthalmic lens of claim 26, wherein said ophthalmic lens is formed of a not fragile organic material that is sufficiently thin and soft to enable cutting by a simple cutting means.

32. The ophthalmic lens of claim 26, wherein said saw-toothed surface is formed of a first material and said ophthalmic lens furthers comprising a second material.

33. The prescription ophthalmic lens of claim 26, wherein said ophthalmic lens is a laminated prescription ophthalmic lens having at least one anterior optical element having a first corrective feature and at least one posterior optical element having a second corrective feature, comprising:

a) at least one anterior or posterior optical element wherein said anterior or posterior optical element is formed of a not fragile organic material that is sufficiently thin and soft to enable cutting by a simple cutting means, b) said at least one anterior or posterior optical element is connected by bonding means, wherein, when connected and curved, form a laminated ophthalmic lens having said required prescription.

34. The at least one anterior or posterior optical element of claim 33, wherein, before connecting said at least one anterior or posterior optical element, said at least one anterior or posterior optical element is backed with an adhesive and a removable non-adhesive sheet is protecting said adhesive.

35. A machine comprising a means to transfer prescription parameters and an arched macroscopic shape into input data that will make a mold or create a desired surface for a prescription optical device, wherein said prescription optical device is characterized by having at least one flat saw-toothed surface zone, and wherein said flat saw-toothed surface zone is characterized by the fact that the required prescription is obtained when said optical device is folded or curved to a predetermined shape.

36. A mold to make a prescription optical device, wherein said prescription optical device is characterized by having at least one flat saw-toothed surface zone, and wherein said flat saw-toothed surface zone is characterized by the fact that the required prescription is obtained when said optical device is folded or curved to a predetermined shape.

* * * * *